(12) United States Patent
Chemel et al.

(10) Patent No.: US 9,832,832 B2
(45) Date of Patent: *Nov. 28, 2017

(54) METHODS, SYSTEMS, AND APPARATUS FOR PROVIDING VARIABLE ILLUMINATION

(71) Applicant: Digital Lumens, Inc., Boston, MA (US)

(72) Inventors: Brian J. Chemel, Marblehead, MA (US); Frederick M. Morgan, Canton, MA (US)

(73) Assignee: Digital Lumens, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/960,105

(22) Filed: Dec. 4, 2015

(65) Prior Publication Data
US 2016/0323958 A1    Nov. 3, 2016

Related U.S. Application Data

(63) Continuation of application No. 14/245,196, filed on Apr. 4, 2014, now Pat. No. 9,241,392, which is a (Continued)

(51) Int. Cl.
*H05B 37/02* (2006.01)
*H05B 33/08* (2006.01)

(52) U.S. Cl.
CPC ..... *H05B 33/0854* (2013.01); *H05B 37/0218* (2013.01); *H05B 37/0227* (2013.01);
(Continued)

(58) Field of Classification Search
CPC ............ H05B 33/0854; H05B 37/0218; H05B 37/0272; H05B 37/0254; H05B 37/0245;
(Continued)

(56) References Cited

U.S. PATENT DOCUMENTS 2,899,541 A    8/1957  De Mauro
D185,410 S     6/1959  Bodian
(Continued)

FOREIGN PATENT DOCUMENTS

CN    1873908 A     12/2006
JP    2005-073133    3/1993
(Continued)

OTHER PUBLICATIONS

Extended European Report and Opinion for European Patent Application No. EP 13763788.0, dated Dec. 17, 2015, 7 pages.
(Continued)

*Primary Examiner* — Vibol Tan
(74) *Attorney, Agent, or Firm* — Cooley LLP

(57) ABSTRACT

Digital Control Ready (DCR) is a two-way open standard for controlling and managing next-generation fixtures. A DCR-enabled lighting fixture responds to digital control signals from a separate digital light agent (DLA) instead of analog dimming signals, eliminating the need for digital-to-analog signal conditioning, fixture-to-fixture variations in response, and calibration specific to each fixture. In addition, a DCR-enabled lighting fixture may also report its power consumption, measured light output, measured color temperature, temperature, and/or other operating parameters to the DLA via the same bidirectional data link that carries the digital control signals to the fixture. The DLA processes these signals in a feedback loop to implement more precise lighting control. The DCR-enabled lighting fixture also transforms AC power to DC power and supplies (and measures) DC power to the DLA via a DCR interface. These features enable intelligent, networked DCR lighting systems operate with lower power (energy) consumption, greater flexibility, and simpler installation than other intelligent lighting networks.

16 Claims, 10 Drawing Sheets

Related U.S. Application Data continuation of application No. 14/045,679, filed on Oct. 3, 2013, now Pat. No. 8,729,833, which is a continuation of application No. PCT/US2013/031790, filed on Mar. 14, 2013.

(60) Provisional application No. 61/762,592, filed on Feb. 8, 2013, provisional application No. 61/867,635, filed on Sep. 6, 2012, provisional application No. 61/612,580, filed on Mar. 19, 2012.

(52) U.S. Cl.
CPC ..... *H05B 37/0254* (2013.01); *H05B 37/0272* (2013.01); *Y02B 20/48* (2013.01)

(58) Field of Classification Search
CPC .......................... H05B 37/02; H05B 33/0872; H05B 33/0842; H05B 33/0845; H05B 33/08; Y02B 20/48; Y02B 20/42; Y02B 20/46; Y02B 20/44; Y02B 20/40; Y02B 70/325; Y02B 70/3283; Y02B 90/2653; F21Y 2115/10
See application file for complete search history.

(56) References Cited

U.S. PATENT DOCUMENTS

| | | |
|---|---|---|
| D191,530 S | 10/1961 | Zurawski |
| D200,548 S | 3/1965 | Reeves |
| 4,194,181 A | 3/1980 | Brundage |
| 4,217,646 A | 8/1980 | Caltagirone et al. |
| 4,277,691 A | 7/1981 | Lunn |
| 4,298,922 A | 11/1981 | Hardwick |
| 4,558,275 A | 12/1985 | Borowy et al. |
| 4,755,920 A | 7/1988 | Tinley |
| 4,772,825 A | 9/1988 | Tabor et al. |
| 4,780,731 A | 10/1988 | Creutzmann et al. |
| D300,471 S | 3/1989 | Szymanek |
| 4,873,469 A | 10/1989 | Young et al. |
| 5,055,985 A | 10/1991 | Fabbri |
| 5,144,222 A | 9/1992 | Herbert |
| 5,323,334 A | 6/1994 | Meyers et al. |
| 5,430,356 A | 7/1995 | Ference et al. |
| 5,455,487 A | 10/1995 | Mix et al. |
| 5,521,852 A | 5/1996 | Hibbs et al. |
| 5,521,853 A | 5/1996 | Hibbs et al. |
| D374,301 S | 10/1996 | Kleffman |
| 5,566,084 A | 10/1996 | Cmar |
| 5,572,237 A | 11/1996 | Crooks et al. |
| 5,572,239 A | 11/1996 | Jaeger |
| 5,640,792 A | 6/1997 | Smith et al. |
| 5,655,833 A | 8/1997 | Raczynski |
| 5,668,446 A | 9/1997 | Baker |
| 5,739,639 A | 4/1998 | Johnson |
| 5,753,983 A | 5/1998 | Dickie et al. |
| 5,764,146 A | 6/1998 | Baldwin et al. |
| 5,895,986 A | 4/1999 | Walters et al. |
| 5,914,865 A | 6/1999 | Barbehenn et al. |
| 5,945,993 A | 8/1999 | Fleischmann |
| 5,971,597 A | 10/1999 | Baldwin et al. |
| 6,016,038 A | 1/2000 | Mueller et al. |
| 6,025,679 A | 2/2000 | Harper et al. |
| 6,028,396 A | 2/2000 | Morrissey, Jr. et al. |
| 6,028,597 A | 2/2000 | Ryan et al. |
| 6,035,266 A | 3/2000 | Williams et al. |
| 6,092,913 A | 7/2000 | Edwards, Jr. |
| 6,097,419 A | 8/2000 | Morris et al. |
| 6,113,137 A | 9/2000 | Mizutani et al. |
| 6,118,230 A | 9/2000 | Fleischmann |
| 6,150,774 A | 11/2000 | Mueller et al. |
| 6,151,529 A | 11/2000 | Batko |
| 6,160,359 A | 12/2000 | Fleischmann |
| 6,166,496 A | 12/2000 | Lys et al. |
| 6,211,626 B1 | 4/2001 | Lys et al. |
| 6,257,735 B1 | 7/2001 | Baar |
| D447,266 S | 8/2001 | Verfuerth |
| 6,292,901 B1 | 9/2001 | Lys et al. |
| 6,340,868 B1 | 1/2002 | Lys et al. |
| 6,359,555 B1 | 3/2002 | Williams |
| 6,370,489 B1 | 4/2002 | Williams et al. |
| D457,667 S | 5/2002 | Piepgras et al. |
| D457,669 S | 5/2002 | Piepgras et al. |
| D457,974 S | 5/2002 | Piepgras et al. |
| 6,384,722 B1 | 5/2002 | Williams |
| 6,388,399 B1 | 5/2002 | Eckel et al. |
| 6,393,381 B1 | 5/2002 | Williams et al. |
| D458,395 S | 6/2002 | Piepgras et al. |
| D460,735 S | 7/2002 | Verfuerth |
| 6,415,205 B1 | 7/2002 | Myron et al. |
| 6,415,245 B2 | 7/2002 | Williams et al. |
| 6,428,183 B1 | 8/2002 | McAlpin |
| D463,059 S | 9/2002 | Verfuerth |
| D463,610 S | 9/2002 | Piepgras et al. |
| 6,452,339 B1 | 9/2002 | Morrissey, Jr. et al. |
| 6,452,340 B1 | 9/2002 | Morrissey, Jr. et al. |
| 6,456,960 B1 | 9/2002 | Williams et al. |
| 6,459,919 B1 | 10/2002 | Lys et al. |
| 6,466,190 B1 | 10/2002 | Evoy |
| 6,467,933 B2 | 10/2002 | Baar |
| 6,486,790 B1 | 11/2002 | Perlo et al. |
| D468,035 S | 12/2002 | Blanc et al. |
| 6,491,412 B1 | 12/2002 | Bowman et al. |
| 6,517,218 B2 | 2/2003 | Hochstein |
| 6,528,954 B1 | 3/2003 | Lys et al. |
| 6,548,967 B1 | 4/2003 | Dowling et al. |
| 6,577,080 B2 | 6/2003 | Lys et al. |
| 6,585,396 B1 | 7/2003 | Verfuerth |
| 6,604,062 B2 | 8/2003 | Williams et al. |
| 6,608,453 B2 | 8/2003 | Morgan et al. |
| D479,826 S | 9/2003 | Verfuerth et al. |
| 6,624,597 B2 | 9/2003 | Dowling et al. |
| 6,641,284 B2 | 11/2003 | Stopa et al. |
| 6,652,119 B1 | 11/2003 | Barton |
| D483,332 S | 12/2003 | Verfuerth |
| 6,710,588 B1 | 3/2004 | Verfuerth et al. |
| 6,714,895 B2 | 3/2004 | Williams et al. |
| 6,717,376 B2 | 4/2004 | Lys et al. |
| 6,720,745 B2 | 4/2004 | Lys et al. |
| 6,724,180 B1 | 4/2004 | Verfuerth et al. |
| D491,678 S | 6/2004 | Piepgras |
| D492,042 S | 6/2004 | Piepgras |
| 6,746,274 B1 | 6/2004 | Verfuerth |
| 6,748,299 B1 | 6/2004 | Motoyama |
| 6,758,580 B1 | 7/2004 | Verfuerth |
| D494,700 S | 8/2004 | Hartman et al. |
| 6,774,584 B2 | 8/2004 | Lys et al. |
| 6,774,619 B1 | 8/2004 | Verfuerth et al. |
| 6,777,891 B2 | 8/2004 | Lys et al. |
| 6,781,329 B2 | 8/2004 | Mueller et al. |
| 6,788,011 B2 | 9/2004 | Mueller et al. |
| 6,791,458 B2 | 9/2004 | Baldwin |
| 6,798,341 B1 | 9/2004 | Eckel et al. |
| 6,801,003 B2 | 10/2004 | Schanberger et al. |
| 6,806,659 B1 | 10/2004 | Mueller et al. |
| 6,807,516 B2 | 10/2004 | Williams et al. |
| 6,841,944 B2 | 1/2005 | Morrissey, Jr. et al. |
| 6,869,204 B2 | 3/2005 | Morgan et al. |
| 6,883,929 B2 | 4/2005 | Dowling |
| 6,888,322 B2 | 5/2005 | Dowling et al. |
| 6,892,168 B2 | 5/2005 | Williams et al. |
| 6,909,921 B1 | 6/2005 | Bilger |
| 6,933,627 B2 | 8/2005 | Wilhelm |
| 6,936,978 B2 | 8/2005 | Morgan et al. |
| 6,964,502 B1 | 11/2005 | Verfuerth |
| 6,965,205 B2 | 11/2005 | Piepgras et al. |
| 6,967,448 B2 | 11/2005 | Morgan et al. |
| 6,969,954 B2 | 11/2005 | Lys |
| 6,975,079 B2 | 12/2005 | Lys et al. |
| 7,002,546 B1 | 2/2006 | Stuppi et al. |
| D518,218 S | 3/2006 | Roberge et al. |
| 7,014,336 B1 | 3/2006 | Ducharme et al. |
| 7,019,276 B2 | 3/2006 | Cloutier et al. |
| 7,031,920 B2 | 4/2006 | Dowling et al. |
| 7,038,398 B1 | 5/2006 | Lys et al. |

(56) References Cited

U.S. PATENT DOCUMENTS

| | | |
|---|---|---|
| 7,038,399 B2 | 5/2006 | Lys et al. |
| 7,042,172 B2 | 5/2006 | Dowling et al. |
| 7,062,360 B2 | 6/2006 | Fairlie et al. |
| 7,064,498 B2 | 6/2006 | Dowling et al. |
| 7,093,952 B2 | 8/2006 | Ono et al. |
| 7,113,541 B1 | 9/2006 | Lys et al. |
| 7,132,635 B2 | 11/2006 | Dowling |
| 7,132,785 B2 | 11/2006 | Ducharme |
| 7,132,804 B2 | 11/2006 | Lys et al. |
| 7,135,824 B2 | 11/2006 | Lys et al. |
| 7,139,617 B1 | 11/2006 | Morgan et al. |
| 7,160,140 B1 | 1/2007 | Mrakovich et al. |
| 7,161,311 B2 | 1/2007 | Mueller et al. |
| 7,161,313 B2 | 1/2007 | Piepgras et al. |
| 7,161,556 B2 | 1/2007 | Morgan et al. |
| 7,178,941 B2 | 2/2007 | Roberge et al. |
| 7,180,252 B2 | 2/2007 | Lys et al. |
| D538,462 S | 3/2007 | Verfuerth et al. |
| 7,186,003 B2 | 3/2007 | Dowling et al. |
| 7,187,141 B2 | 3/2007 | Mueller et al. |
| 7,190,121 B2 | 3/2007 | Rose et al. |
| 7,199,531 B2 | 4/2007 | Loughrey |
| 7,202,613 B2 | 4/2007 | Morgan et al. |
| 7,204,622 B2 | 4/2007 | Dowling et al. |
| 7,220,015 B2 | 5/2007 | Dowling |
| 7,220,018 B2 | 5/2007 | Crabb et al. |
| 7,221,104 B2 | 5/2007 | Lys et al. |
| 7,228,190 B2 | 6/2007 | Dowling et al. |
| 7,231,060 B2 | 6/2007 | Dowling et al. |
| 7,233,115 B2 | 6/2007 | Lys |
| 7,233,831 B2 | 6/2007 | Blackwell |
| 7,236,366 B2 | 6/2007 | Chen |
| 7,242,152 B2 | 7/2007 | Dowling et al. |
| 7,248,239 B2 | 7/2007 | Dowling et al. |
| D548,868 S | 8/2007 | Roberge et al. |
| 7,253,566 B2 | 8/2007 | Lys et al. |
| 7,255,457 B2 | 8/2007 | Ducharme et al. |
| 7,256,554 B2 | 8/2007 | Lys |
| 7,256,556 B2 | 8/2007 | Lane et al. |
| 7,274,160 B2 | 9/2007 | Mueller et al. |
| 7,274,975 B2 | 9/2007 | Miller |
| 7,300,192 B2 | 11/2007 | Mueller et al. |
| D557,817 S | 12/2007 | Verfuerth |
| 7,303,300 B2 | 12/2007 | Dowling et al. |
| 7,308,296 B2 | 12/2007 | Lys et al. |
| 7,309,965 B2 | 12/2007 | Dowling et al. |
| 7,311,423 B2 | 12/2007 | Frecska et al. |
| D560,469 S | 1/2008 | Bartol et al. |
| D562,494 S | 2/2008 | Piepgras |
| 7,333,903 B2 | 2/2008 | Walters et al. |
| 7,344,279 B2 | 3/2008 | Mueller et al. |
| 7,344,296 B2 | 3/2008 | Matsui et al. |
| 7,348,736 B2 | 3/2008 | Piepgras et al. |
| D566,323 S | 4/2008 | Piepgras et al. |
| 7,350,936 B2 | 4/2008 | Ducharme et al. |
| 7,352,138 B2 | 4/2008 | Lys et al. |
| 7,352,339 B2 | 4/2008 | Morgan et al. |
| 7,353,071 B2 | 4/2008 | Blackwell et al. |
| 7,354,172 B2 | 4/2008 | Chemel et al. |
| 7,358,679 B2 | 4/2008 | Lys et al. |
| 7,358,929 B2 | 4/2008 | Mueller et al. |
| 7,385,359 B2 | 6/2008 | Dowling et al. |
| 7,387,405 B2 | 6/2008 | Ducharme et al. |
| 7,391,335 B2 | 6/2008 | Mubaslat et al. |
| 7,401,942 B1 | 7/2008 | Verfuerth et al. |
| 7,411,489 B1 | 8/2008 | Elwell et al. |
| 7,427,840 B2 | 9/2008 | Morgan et al. |
| 7,445,354 B2 | 11/2008 | Aoki et al. |
| 7,453,217 B2 | 11/2008 | Lys et al. |
| 7,470,055 B2 | 12/2008 | Hacker et al. |
| 7,482,565 B2 | 1/2009 | Morgan et al. |
| 7,482,764 B2 | 1/2009 | Morgan et al. |
| 7,495,671 B2 | 2/2009 | Chemel et al. |
| 7,501,768 B2 | 3/2009 | Lane et al. |
| 7,502,034 B2 | 3/2009 | Chemel et al. |
| 7,506,993 B2 | 3/2009 | Kain et al. |
| 7,507,001 B2 | 3/2009 | Kit |
| 7,518,319 B2 | 4/2009 | Konno et al. |
| 7,520,634 B2 | 4/2009 | Ducharme et al. |
| D592,786 S | 5/2009 | Bisberg et al. |
| 7,529,594 B2 | 5/2009 | Walters et al. |
| D593,697 S | 6/2009 | Liu et al. |
| 7,543,956 B2 | 6/2009 | Piepgras et al. |
| 7,546,167 B2 | 6/2009 | Walters et al. |
| 7,546,168 B2 | 6/2009 | Walters et al. |
| 7,550,931 B2 | 6/2009 | Lys et al. |
| 7,550,935 B2 | 6/2009 | Lys et al. |
| D595,894 S | 7/2009 | Verfuerth et al. |
| 7,563,006 B1 | 7/2009 | Verfuerth et al. |
| 7,571,063 B2 | 8/2009 | Howell et al. |
| 7,572,028 B2 | 8/2009 | Mueller et al. |
| 7,575,338 B1 | 8/2009 | Verfuerth |
| 7,598,681 B2 | 10/2009 | Lys et al. |
| 7,598,684 B2 | 10/2009 | Lys et al. |
| 7,598,686 B2 | 10/2009 | Lys et al. |
| 7,603,184 B2 | 10/2009 | Walters et al. |
| 7,619,370 B2 | 11/2009 | Chemel et al. |
| D606,697 S | 12/2009 | Verfuerth et al. |
| D606,698 S | 12/2009 | Verfuerth et al. |
| 7,628,506 B2 | 12/2009 | Verfuerth et al. |
| 7,638,743 B2 | 12/2009 | Bartol et al. |
| 7,642,730 B2 | 1/2010 | Dowling et al. |
| 7,646,029 B2 | 1/2010 | Mueller et al. |
| 7,659,674 B2 | 2/2010 | Mueller et al. |
| 7,660,892 B2 | 2/2010 | Choong et al. |
| 7,703,951 B2 | 4/2010 | Piepgras et al. |
| D617,028 S | 6/2010 | Verfuerth et al. |
| D617,029 S | 6/2010 | Verfuerth et al. |
| 7,744,251 B2 | 6/2010 | Liu et al. |
| 7,746,003 B2 | 6/2010 | Verfuerth et al. |
| 7,753,568 B2 | 7/2010 | Hu et al. |
| 7,761,260 B2 | 7/2010 | Walters et al. |
| 7,762,861 B2 | 7/2010 | Verfuerth et al. |
| D621,410 S | 8/2010 | Verfuerth et al. |
| D621,411 S | 8/2010 | Verfuerth et al. |
| 7,766,518 B2 | 8/2010 | Piepgras et al. |
| 7,777,427 B2 | 8/2010 | Stalker, III |
| 7,780,310 B2 | 8/2010 | Verfuerth et al. |
| 7,783,390 B2 | 8/2010 | Miller |
| 7,784,966 B2 | 8/2010 | Verfuerth et al. |
| D623,340 S | 9/2010 | Verfuerth et al. |
| 7,792,956 B2 | 9/2010 | Choong et al. |
| 7,809,448 B2 | 10/2010 | Lys et al. |
| 7,824,065 B2 | 11/2010 | Maxik |
| 7,828,465 B2 | 11/2010 | Roberge et al. |
| 7,839,017 B2 | 11/2010 | Huizenga et al. |
| 7,839,295 B2 | 11/2010 | Ries, II |
| 7,845,823 B2 | 12/2010 | Mueller et al. |
| 7,852,017 B1 | 12/2010 | Melanson |
| 7,866,847 B2 | 1/2011 | Zheng |
| D632,006 S | 2/2011 | Verfuerth et al. |
| D632,418 S | 2/2011 | Bisberg et al. |
| 7,878,683 B2 | 2/2011 | Logan et al. |
| 7,911,359 B2 | 3/2011 | Walters et al. |
| 7,924,155 B2 | 4/2011 | Soccoli et al. |
| 7,925,384 B2 | 4/2011 | Huizenga et al. |
| 7,926,974 B2 | 4/2011 | Wung et al. |
| 7,936,561 B1 | 5/2011 | Lin |
| 7,938,558 B2 | 5/2011 | Wilcox et al. |
| 7,959,320 B2 | 6/2011 | Mueller et al. |
| 7,962,606 B2 | 6/2011 | Barron et al. |
| 7,976,188 B2 | 7/2011 | Peng |
| 7,988,335 B2 | 8/2011 | Liu et al. |
| 7,988,341 B2 | 8/2011 | Chen |
| 7,997,762 B2 | 8/2011 | Wang et al. |
| 8,010,319 B2 | 8/2011 | Walters et al. |
| 8,013,281 B2 | 9/2011 | Morgan et al. |
| 8,025,426 B2 | 9/2011 | Mundle et al. |
| 8,033,686 B2 | 10/2011 | Recker et al. |
| 8,035,320 B2 | 10/2011 | Sibert |
| 8,042,968 B2 | 10/2011 | Boyer et al. |
| 8,052,301 B2 | 11/2011 | Zhou et al. |
| 8,061,865 B2 | 11/2011 | Piepgras et al. |
| 8,066,403 B2 | 11/2011 | Sanfilippo et al. |

(56) References Cited

U.S. PATENT DOCUMENTS

| | | |
|---|---|---|
| 8,067,906 B2 | 11/2011 | Null |
| D650,225 S | 12/2011 | Bartol et al. |
| 8,070,312 B2 | 12/2011 | Verfuerth et al. |
| 8,079,731 B2 | 12/2011 | Lynch et al. |
| 8,080,819 B2 | 12/2011 | Mueller et al. |
| 8,096,679 B2 | 1/2012 | Chen et al. |
| 8,101,434 B2 | 1/2012 | Guillien et al. |
| 8,136,958 B2 | 3/2012 | Verfuerth et al. |
| 8,138,690 B2 | 3/2012 | Chemel et al. |
| 8,147,267 B2 | 4/2012 | Oster |
| RE43,456 E | 6/2012 | Verfuerth et al. |
| 8,214,061 B2 | 7/2012 | Westrick, Jr. et al. |
| 8,232,745 B2 | 7/2012 | Chemel et al. |
| 8,237,581 B2 | 8/2012 | Ries, II |
| 8,237,582 B2 | 8/2012 | Ries, II |
| 8,242,927 B2 | 8/2012 | Ries, II |
| 8,260,575 B2 | 9/2012 | Walters et al. |
| 8,265,674 B2 | 9/2012 | Choong et al. |
| 8,275,471 B2 | 9/2012 | Huizenga et al. |
| 8,337,043 B2 | 12/2012 | Verfuerth et al. |
| 8,339,069 B2 | 12/2012 | Chemel et al. |
| 8,344,660 B2 | 1/2013 | Mohan et al. |
| 8,344,665 B2 | 1/2013 | Verfuerth et al. |
| 8,364,325 B2 | 1/2013 | Huizenga et al. |
| 8,368,321 B2 | 2/2013 | Chemel et al. |
| 8,370,483 B2 | 2/2013 | Choong et al. |
| 8,373,362 B2 | 2/2013 | Chemel et al. |
| 8,376,583 B2 | 2/2013 | Wang et al. |
| 8,376,600 B2 | 2/2013 | Bartol et al. |
| 8,406,937 B2 | 3/2013 | Verfuerth et al. |
| 8,415,897 B2 | 4/2013 | Choong et al. |
| 8,422,401 B1 | 4/2013 | Choong et al. |
| 8,445,826 B2 | 5/2013 | Verfuerth |
| 8,450,670 B2 | 5/2013 | Verfuerth et al. |
| 8,457,793 B2 | 6/2013 | Golding et al. |
| 8,466,626 B2 | 6/2013 | Null et al. |
| 8,476,565 B2 | 7/2013 | Verfuerth |
| 8,503,330 B1 | 8/2013 | Choong et al. |
| 8,527,105 B1 | 9/2013 | Choong et al. |
| 8,531,134 B2 | 9/2013 | Chemel et al. |
| 8,536,802 B2 | 9/2013 | Chemel et al. |
| 8,543,249 B2 | 9/2013 | Chemel et al. |
| 8,552,664 B2 | 10/2013 | Chemel et al. |
| 8,586,902 B2 | 11/2013 | Verfuerth |
| 8,593,135 B2 | 11/2013 | Chemel et al. |
| 8,604,701 B2 * | 12/2013 | Verfuerth .......... H05B 37/0227 315/149 |
| 8,610,376 B2 | 12/2013 | Chemel et al. |
| 8,610,377 B2 | 12/2013 | Chemel et al. |
| 8,680,789 B2 | 3/2014 | Mohan et al. |
| 8,729,833 B2 * | 5/2014 | Chemel .............. H05B 33/0854 315/308 |
| 8,754,589 B2 | 6/2014 | Chemel et al. |
| 8,755,039 B2 | 6/2014 | Ramer et al. |
| 8,766,799 B2 | 7/2014 | Gray et al. |
| 8,805,550 B2 | 8/2014 | Chemel et al. |
| 8,816,851 B2 | 8/2014 | Mohan et al. |
| 8,823,277 B2 | 9/2014 | Chemel et al. |
| 8,841,859 B2 | 9/2014 | Chemel et al. |
| 8,860,327 B2 | 10/2014 | Choong et al. |
| 8,866,408 B2 | 10/2014 | Chemel et al. |
| 8,890,418 B2 | 11/2014 | Mohan et al. |
| 8,909,380 B2 | 12/2014 | Golding et al. |
| 8,954,170 B2 | 2/2015 | Chemel et al. |
| 9,002,522 B2 * | 4/2015 | Mohan ............... H05B 37/0218 700/275 |
| 9,014,829 B2 | 4/2015 | Chemel et al. |
| 9,049,753 B1 * | 6/2015 | Wassel .................. H05B 37/02 |
| 9,072,133 B2 | 6/2015 | Chemel et al. |
| 9,078,305 B2 | 7/2015 | Pelton et al. |
| 9,082,202 B2 | 7/2015 | Kovesi et al. |
| 9,125,254 B2 | 9/2015 | Chemel et al. |
| 9,131,545 B2 * | 9/2015 | Verfuerth .......... H05B 37/0227 |
| 9,188,997 B2 | 11/2015 | Mohan et al. |
| 9,241,392 B2 * | 1/2016 | Chemel .............. H05B 33/0854 |
| 9,510,426 B2 * | 11/2016 | Chemel .............. H05B 33/0854 |
| 2001/0028227 A1 | 10/2001 | Lys et al. |
| 2001/0055965 A1 | 12/2001 | Delp et al. |
| 2002/0032535 A1 | 3/2002 | Alexander et al. |
| 2002/0036430 A1 | 3/2002 | Welches et al. |
| 2002/0038157 A1 | 3/2002 | Dowling et al. |
| 2002/0047628 A1 | 4/2002 | Morgan et al. |
| 2002/0048169 A1 | 4/2002 | Dowling et al. |
| 2002/0070688 A1 | 6/2002 | Dowling et al. |
| 2002/0074559 A1 | 6/2002 | Dowling et al. |
| 2002/0078221 A1 | 6/2002 | Blackwell et al. |
| 2002/0101197 A1 | 8/2002 | Lys et al. |
| 2002/0113555 A1 | 8/2002 | Lys et al. |
| 2002/0130627 A1 | 9/2002 | Morgan et al. |
| 2002/0133270 A1 | 9/2002 | Hung et al. |
| 2002/0134849 A1 | 9/2002 | Disser |
| 2002/0145394 A1 | 10/2002 | Morgan et al. |
| 2002/0152045 A1 | 10/2002 | Dowling et al. |
| 2002/0153851 A1 | 10/2002 | Morgan et al. |
| 2002/0163316 A1 | 11/2002 | Lys et al. |
| 2002/0171365 A1 | 11/2002 | Morgan et al. |
| 2002/0171377 A1 | 11/2002 | Mueller et al. |
| 2002/0171378 A1 | 11/2002 | Morgan et al. |
| 2002/0175642 A1 | 11/2002 | von Kannewurff et al. |
| 2003/0011538 A1 | 1/2003 | Lys et al. |
| 2003/0057886 A1 | 3/2003 | Lys et al. |
| 2003/0057887 A1 | 3/2003 | Dowling et al. |
| 2003/0057888 A1 | 3/2003 | Archenhold et al. |
| 2003/0057890 A1 | 3/2003 | Lys et al. |
| 2003/0063462 A1 | 4/2003 | Shimizu et al. |
| 2003/0076056 A1 | 4/2003 | Schuurmans |
| 2003/0076281 A1 | 4/2003 | Morgan et al. |
| 2003/0097309 A1 | 5/2003 | Gibler et al. |
| 2003/0100837 A1 | 5/2003 | Lys et al. |
| 2003/0100998 A2 | 5/2003 | Brunner et al. |
| 2003/0102675 A1 | 6/2003 | Noethlichs |
| 2003/0123705 A1 | 7/2003 | Stam et al. |
| 2003/0123706 A1 | 7/2003 | Stam et al. |
| 2003/0133292 A1 | 7/2003 | Mueller et al. |
| 2003/0137258 A1 | 7/2003 | Piepgras et al. |
| 2003/0206411 A9 | 11/2003 | Dowling et al. |
| 2003/0214259 A9 | 11/2003 | Dowling et al. |
| 2003/0216971 A1 | 11/2003 | Sick et al. |
| 2003/0222587 A1 | 12/2003 | Dowling et al. |
| 2003/0222603 A1 | 12/2003 | Mogilner et al. |
| 2004/0002792 A1 | 1/2004 | Hoffknecht |
| 2004/0036006 A1 | 2/2004 | Dowling |
| 2004/0052076 A1 | 3/2004 | Mueller et al. |
| 2004/0090191 A1 | 5/2004 | Mueller et al. |
| 2004/0090787 A1 | 5/2004 | Dowling et al. |
| 2004/0105261 A1 | 6/2004 | Ducharme et al. |
| 2004/0105264 A1 | 6/2004 | Spero |
| 2004/0111638 A1 | 6/2004 | Yadav et al. |
| 2004/0113044 A1 | 6/2004 | Ishiguchi |
| 2004/0113568 A1 | 6/2004 | Dowling et al. |
| 2004/0119415 A1 | 6/2004 | Lansing et al. |
| 2004/0130909 A1 | 7/2004 | Mueller et al. |
| 2004/0141321 A1 | 7/2004 | Dowling et al. |
| 2004/0155609 A1 | 8/2004 | Lys et al. |
| 2004/0160199 A1 | 8/2004 | Morgan et al. |
| 2004/0178751 A1 | 9/2004 | Mueller et al. |
| 2004/0212320 A1 | 10/2004 | Dowling et al. |
| 2004/0212321 A1 | 10/2004 | Lys et al. |
| 2004/0212993 A1 | 10/2004 | Morgan et al. |
| 2004/0240890 A1 | 12/2004 | Lys et al. |
| 2004/0252501 A1 | 12/2004 | Moriyama et al. |
| 2004/0257007 A1 | 12/2004 | Lys et al. |
| 2005/0030744 A1 | 2/2005 | Ducharme et al. |
| 2005/0035728 A1 | 2/2005 | Schanberger et al. |
| 2005/0036300 A1 | 2/2005 | Dowling et al. |
| 2005/0040774 A1 | 2/2005 | Mueller et al. |
| 2005/0041161 A1 | 2/2005 | Dowling et al. |
| 2005/0041424 A1 | 2/2005 | Ducharme |
| 2005/0044617 A1 | 3/2005 | Mueller et al. |
| 2005/0047132 A1 | 3/2005 | Dowling et al. |
| 2005/0047134 A1 | 3/2005 | Mueller et al. |
| 2005/0062440 A1 | 3/2005 | Lys et al. |
| 2005/0063194 A1 | 3/2005 | Lys et al. |
| 2005/0099796 A1 | 5/2005 | Magee |

(56) References Cited

U.S. PATENT DOCUMENTS

| | | |
|---|---|---|
| 2005/0099824 A1 | 5/2005 | Dowling et al. |
| 2005/0116667 A1 | 6/2005 | Mueller et al. |
| 2005/0125083 A1 | 6/2005 | Kiko |
| 2005/0128751 A1 | 6/2005 | Roberge et al. |
| 2005/0151489 A1 | 7/2005 | Lys et al. |
| 2005/0162101 A1 | 7/2005 | Leong et al. |
| 2005/0174473 A1 | 8/2005 | Morgan et al. |
| 2005/0213352 A1 | 9/2005 | Lys |
| 2005/0213353 A1 | 9/2005 | Lys |
| 2005/0218838 A1 | 10/2005 | Lys |
| 2005/0218870 A1 | 10/2005 | Lys |
| 2005/0219872 A1 | 10/2005 | Lys |
| 2005/0231133 A1 | 10/2005 | Lys |
| 2005/0236029 A1 | 10/2005 | Dowling |
| 2005/0236998 A1 | 10/2005 | Mueller et al. |
| 2005/0248299 A1 | 11/2005 | Chemel et al. |
| 2005/0253533 A1 | 11/2005 | Lys et al. |
| 2005/0258765 A1 | 11/2005 | Rodriguez et al. |
| 2005/0275626 A1 | 12/2005 | Mueller et al. |
| 2005/0276053 A1 | 12/2005 | Nortrup et al. |
| 2005/0285547 A1 | 12/2005 | Piepgras et al. |
| 2006/0002110 A1 | 1/2006 | Dowling et al. |
| 2006/0012987 A9 | 1/2006 | Ducharme et al. |
| 2006/0022214 A1 | 2/2006 | Morgan et al. |
| 2006/0038511 A1 | 2/2006 | Tagawa |
| 2006/0050509 A9 | 3/2006 | Dowling et al. |
| 2006/0076908 A1 | 4/2006 | Morgan et al. |
| 2006/0087843 A1 | 4/2006 | Setomoto et al. |
| 2006/0098077 A1 | 5/2006 | Dowling |
| 2006/0104058 A1 | 5/2006 | Chemel et al. |
| 2006/0106762 A1 | 5/2006 | Caracas et al. |
| 2006/0108935 A1 | 5/2006 | Steven |
| 2006/0109649 A1 | 5/2006 | Ducharme et al. |
| 2006/0125426 A1 | 6/2006 | Veskovic et al. |
| 2006/0132061 A1 | 6/2006 | McCormick et al. |
| 2006/0146531 A1 | 7/2006 | Reo et al. |
| 2006/0152172 A9 | 7/2006 | Mueller et al. |
| 2006/0158881 A1 | 7/2006 | Dowling |
| 2006/0160199 A1 | 7/2006 | DiCosimo et al. |
| 2006/0170376 A1 | 8/2006 | Piepgras et al. |
| 2006/0181878 A1 | 8/2006 | Burkholder |
| 2006/0198128 A1 | 9/2006 | Piepgras et al. |
| 2006/0208667 A1 | 9/2006 | Lys et al. |
| 2006/0221606 A1 | 10/2006 | Dowling |
| 2006/0245174 A1 | 11/2006 | Ashdown et al. |
| 2006/0262516 A9 | 11/2006 | Dowling et al. |
| 2006/0262521 A1 | 11/2006 | Piepgras et al. |
| 2006/0262544 A1 | 11/2006 | Piepgras et al. |
| 2006/0262545 A1 | 11/2006 | Piepgras et al. |
| 2006/0273741 A1 | 12/2006 | Stalker, III |
| 2006/0276938 A1 | 12/2006 | Miller |
| 2006/0285325 A1 | 12/2006 | Ducharme et al. |
| 2007/0021946 A1 | 1/2007 | Williams et al. |
| 2007/0030716 A1 | 2/2007 | Manolescu |
| 2007/0032990 A1 | 2/2007 | Williams et al. |
| 2007/0040513 A1 | 2/2007 | Cleland et al. |
| 2007/0045407 A1 | 3/2007 | Paul |
| 2007/0047227 A1 | 3/2007 | Ducharme |
| 2007/0064425 A1 | 3/2007 | Frecska et al. |
| 2007/0086754 A1 | 4/2007 | Lys et al. |
| 2007/0086912 A1 | 4/2007 | Dowling et al. |
| 2007/0115658 A1 | 5/2007 | Mueller et al. |
| 2007/0115665 A1 | 5/2007 | Mueller et al. |
| 2007/0143046 A1 | 6/2007 | Budike, Jr. |
| 2007/0145915 A1 | 6/2007 | Roberge et al. |
| 2007/0152797 A1 | 7/2007 | Chemel et al. |
| 2007/0153514 A1 | 7/2007 | Dowling et al. |
| 2007/0188114 A1 | 8/2007 | Lys et al. |
| 2007/0188427 A1 | 8/2007 | Lys et al. |
| 2007/0189026 A1 | 8/2007 | Chemel et al. |
| 2007/0195526 A1 | 8/2007 | Dowling et al. |
| 2007/0206375 A1 | 9/2007 | Piepgras et al. |
| 2007/0211463 A1 | 9/2007 | Chevalier et al. |
| 2007/0217196 A1 | 9/2007 | Shaner |
| 2007/0228999 A1 | 10/2007 | Kit |
| 2007/0229250 A1 | 10/2007 | Recker et al. |
| 2007/0236156 A1 | 10/2007 | Lys et al. |
| 2007/0237284 A1 | 10/2007 | Lys et al. |
| 2007/0258231 A1 | 11/2007 | Koerner et al. |
| 2007/0258240 A1 | 11/2007 | Ducharme et al. |
| 2007/0263379 A1 | 11/2007 | Dowling |
| 2007/0267978 A1 | 11/2007 | Shteynberg et al. |
| 2007/0273307 A1 | 11/2007 | Westrick et al. |
| 2007/0291483 A1 | 12/2007 | Lys |
| 2008/0001071 A1 | 1/2008 | Lee et al. |
| 2008/0007943 A1 | 1/2008 | Verfuerth et al. |
| 2008/0007944 A1 | 1/2008 | Verfuerth et al. |
| 2008/0012502 A1 | 1/2008 | Lys |
| 2008/0012506 A1 | 1/2008 | Mueller et al. |
| 2008/0030149 A1 | 2/2008 | Callahan |
| 2008/0074059 A1 | 3/2008 | Ahmed |
| 2008/0079568 A1 | 4/2008 | Primous et al. |
| 2008/0089060 A1 | 4/2008 | Kondo et al. |
| 2008/0140231 A1 | 6/2008 | Blackwell et al. |
| 2008/0158878 A1 | 7/2008 | Van Laanen et al. |
| 2008/0164826 A1 | 7/2008 | Lys |
| 2008/0164827 A1 | 7/2008 | Lys |
| 2008/0164854 A1 | 7/2008 | Lys |
| 2008/0170371 A1 | 7/2008 | Lai |
| 2008/0180015 A1 | 7/2008 | Wu et al. |
| 2008/0183081 A1 | 7/2008 | Lys et al. |
| 2008/0183307 A1 | 7/2008 | Clayton et al. |
| 2008/0183316 A1 | 7/2008 | Clayton |
| 2008/0195561 A1 | 8/2008 | Herzig |
| 2008/0204268 A1 | 8/2008 | Dowling et al. |
| 2008/0208651 A1 | 8/2008 | Johnston et al. |
| 2008/0215391 A1 | 9/2008 | Dowling et al. |
| 2008/0246415 A1 | 10/2008 | Chitta et al. |
| 2008/0265799 A1 | 10/2008 | Sibert |
| 2008/0272934 A1 | 11/2008 | Wang et al. |
| 2008/0275802 A1 | 11/2008 | Verfuerth et al. |
| 2008/0278941 A1 | 11/2008 | Logan et al. |
| 2008/0310850 A1 | 12/2008 | Pederson et al. |
| 2009/0000217 A1 | 1/2009 | Verfuerth et al. |
| 2009/0009989 A1 | 1/2009 | Verfuerth et al. |
| 2009/0014625 A1 | 1/2009 | Bartol et al. |
| 2009/0018673 A1 | 1/2009 | Dushane et al. |
| 2009/0021955 A1 | 1/2009 | Kuang et al. |
| 2009/0027932 A1 | 1/2009 | Haines et al. |
| 2009/0034263 A1 | 2/2009 | Stenback et al. |
| 2009/0050908 A1 | 2/2009 | Yuan et al. |
| 2009/0051506 A1 | 2/2009 | Hicksted et al. |
| 2009/0059603 A1 | 3/2009 | Recker et al. |
| 2009/0059915 A1 | 3/2009 | Baker |
| 2009/0066266 A1 | 3/2009 | Jungwirth et al. |
| 2009/0076790 A1 | 3/2009 | Fein et al. |
| 2009/0085494 A1 | 4/2009 | Summerland |
| 2009/0085500 A1 | 4/2009 | Zampini et al. |
| 2009/0122571 A1 | 5/2009 | Simmons et al. |
| 2009/0147507 A1 | 6/2009 | Verfuerth et al. |
| 2009/0160364 A1 | 6/2009 | Ackermann et al. |
| 2009/0189535 A1 | 7/2009 | Verfuerth et al. |
| 2009/0193217 A1 | 7/2009 | Korecki et al. |
| 2009/0243517 A1 | 10/2009 | Verfuerth et al. |
| 2009/0248217 A1 | 10/2009 | Verfuerth et al. |
| 2009/0267540 A1 | 10/2009 | Chemel et al. |
| 2009/0278472 A1 | 11/2009 | Mills et al. |
| 2009/0278479 A1 | 11/2009 | Platner et al. |
| 2009/0284184 A1 | 11/2009 | Valois et al. |
| 2009/0299527 A1 | 12/2009 | Huizenga et al. |
| 2009/0299811 A1 | 12/2009 | Verfuerth et al. |
| 2009/0303722 A1 | 12/2009 | Verfuerth et al. |
| 2009/0315485 A1 | 12/2009 | Verfuerth et al. |
| 2009/0323347 A1 | 12/2009 | Zhang et al. |
| 2010/0026479 A1 | 2/2010 | Tran |
| 2010/0034386 A1 | 2/2010 | Choong et al. |
| 2010/0052574 A1 | 3/2010 | Blakeley |
| 2010/0061088 A1 | 3/2010 | Bartol et al. |
| 2010/0109536 A1 | 5/2010 | Jung et al. |
| 2010/0124376 A1 | 5/2010 | Thind |
| 2010/0127634 A1 | 5/2010 | Dowling et al. |
| 2010/0134051 A1 | 6/2010 | Huizenga et al. |
| 2010/0135186 A1 | 6/2010 | Choong et al. |
| 2010/0148689 A1 | 6/2010 | Morgan et al. |

(56) References Cited

U.S. PATENT DOCUMENTS

| | | |
|---|---|---|
| 2010/0169249 A1 | 7/2010 | Jhala et al. |
| 2010/0171145 A1 | 7/2010 | Morgan et al. |
| 2010/0171442 A1 | 7/2010 | Draper et al. |
| 2010/0185339 A1 | 7/2010 | Huizenga et al. |
| 2010/0201267 A1 | 8/2010 | Bourquin et al. |
| 2010/0204841 A1 | 8/2010 | Chemel et al. |
| 2010/0207534 A1 | 8/2010 | Dowling et al. |
| 2010/0211443 A1 | 8/2010 | Carrel et al. |
| 2010/0246168 A1 | 9/2010 | Verfuerth et al. |
| 2010/0246172 A1 | 9/2010 | Liu |
| 2010/0253499 A1 | 10/2010 | Haab et al. |
| 2010/0259931 A1 | 10/2010 | Chemel et al. |
| 2010/0262313 A1 | 10/2010 | Chambers et al. |
| 2010/0264834 A1 | 10/2010 | Gaines et al. |
| 2010/0264846 A1 | 10/2010 | Chemel et al. |
| 2010/0270933 A1 | 10/2010 | Chemel et al. |
| 2010/0283605 A1 | 11/2010 | Nevins |
| 2010/0295473 A1 | 11/2010 | Chemel et al. |
| 2010/0295474 A1 | 11/2010 | Chemel et al. |
| 2010/0295475 A1 | 11/2010 | Chemel et al. |
| 2010/0295482 A1 | 11/2010 | Chemel et al. |
| 2010/0296285 A1 | 11/2010 | Chemel et al. |
| 2010/0301768 A1 | 12/2010 | Chemel et al. |
| 2010/0301769 A1 | 12/2010 | Chemel et al. |
| 2010/0301770 A1 | 12/2010 | Chemel et al. |
| 2010/0301771 A1 | 12/2010 | Chemel et al. |
| 2010/0301773 A1 | 12/2010 | Chemel et al. |
| 2010/0301774 A1 | 12/2010 | Chemel et al. |
| 2010/0301834 A1 | 12/2010 | Chemel et al. |
| 2010/0302779 A1 | 12/2010 | Chemel et al. |
| 2010/0307075 A1 | 12/2010 | Zampini et al. |
| 2010/0308736 A1 | 12/2010 | Hung et al. |
| 2010/0327766 A1 | 12/2010 | Recker et al. |
| 2011/0001436 A1 | 1/2011 | Chemel et al. |
| 2011/0001438 A1 | 1/2011 | Chemel et al. |
| 2011/0033632 A1 | 2/2011 | Vance et al. |
| 2011/0035404 A1 | 2/2011 | Morgan et al. |
| 2011/0038148 A1 | 2/2011 | Pyle |
| 2011/0043124 A1 | 2/2011 | Johnston et al. |
| 2011/0057581 A1 | 3/2011 | Ashar et al. |
| 2011/0060701 A1 | 3/2011 | Verfuerth et al. |
| 2011/0068702 A1 | 3/2011 | Van De Ven et al. |
| 2011/0084608 A1 | 4/2011 | Lin et al. |
| 2011/0090684 A1 | 4/2011 | Logan et al. |
| 2011/0102052 A1 | 5/2011 | Billingsley et al. |
| 2011/0118890 A1 | 5/2011 | Parsons |
| 2011/0133655 A1 | 6/2011 | Recker et al. |
| 2011/0140611 A1 | 6/2011 | Elek et al. |
| 2011/0140612 A1 | 6/2011 | Mohan et al. |
| 2011/0146669 A1 | 6/2011 | Bartol et al. |
| 2011/0172844 A1 | 7/2011 | Choong et al. |
| 2011/0198977 A1 | 8/2011 | VanderSluis |
| 2011/0204820 A1 | 8/2011 | Tikkanen et al. |
| 2011/0215736 A1 | 9/2011 | Horbst et al. |
| 2011/0216538 A1 | 9/2011 | Logan et al. |
| 2011/0235317 A1 | 9/2011 | Verfuerth et al. |
| 2011/0248171 A1 | 10/2011 | Rueger et al. |
| 2011/0254466 A1 | 10/2011 | Jackson et al. |
| 2011/0279063 A1 | 11/2011 | Wang et al. |
| 2011/0279248 A1 | 11/2011 | Ogawa |
| 2012/0007511 A1 | 1/2012 | Choong et al. |
| 2012/0032599 A1 | 2/2012 | Mohan et al. |
| 2012/0037725 A1 | 2/2012 | Verfuerth |
| 2012/0038281 A1 | 2/2012 | Verfuerth |
| 2012/0038490 A1 | 2/2012 | Verfuerth |
| 2012/0040606 A1 | 2/2012 | Verfuerth |
| 2012/0044350 A1 | 2/2012 | Verfuerth |
| 2012/0044670 A1 | 2/2012 | Piepgras et al. |
| 2012/0058663 A1 | 3/2012 | Oster |
| 2012/0062125 A1 | 3/2012 | Mohan et al. |
| 2012/0080944 A1 | 4/2012 | Recker et al. |
| 2012/0081906 A1 | 4/2012 | Verfuerth et al. |
| 2012/0086363 A1 | 4/2012 | Golding et al. |
| 2012/0098439 A1 | 4/2012 | Recker et al. |
| 2012/0112654 A1 | 5/2012 | Choong et al. |
| 2012/0112667 A1 | 5/2012 | Mohan et al. |
| 2012/0130544 A1 | 5/2012 | Mohan et al. |
| 2012/0143357 A1 | 6/2012 | Chemel et al. |
| 2012/0153844 A1 | 6/2012 | Chobot |
| 2012/0167957 A1 | 7/2012 | Verfuerth et al. |
| 2012/0182729 A1 | 7/2012 | Verfuerth et al. |
| 2012/0203601 A1 | 8/2012 | Verfuerth et al. |
| 2012/0209755 A1 | 8/2012 | Verfuerth et al. |
| 2012/0229049 A1 | 9/2012 | Mohan et al. |
| 2012/0233045 A1 | 9/2012 | Verfuerth et al. |
| 2012/0235579 A1 | 9/2012 | Chemel et al. |
| 2012/0262074 A1 | 10/2012 | Wang |
| 2012/0274222 A1 | 11/2012 | Verfuerth et al. |
| 2012/0286673 A1 | 11/2012 | Holland et al. |
| 2012/0299485 A1 | 11/2012 | Mohan et al. |
| 2012/0326608 A1 | 12/2012 | Mohan et al. |
| 2013/0006437 A1 | 1/2013 | Verfuerth et al. |
| 2013/0020949 A1 | 1/2013 | Mohan et al. |
| 2013/0033183 A1 | 2/2013 | Verfuerth et al. |
| 2013/0063042 A1 | 3/2013 | Bora et al. |
| 2013/0069542 A1 | 3/2013 | Curasi et al. |
| 2013/0069543 A1 | 3/2013 | Mohan et al. |
| 2013/0088168 A1 | 4/2013 | Mohan et al. |
| 2013/0093323 A1 | 4/2013 | Radermacher |
| 2013/0094230 A1 | 4/2013 | Verfuerth et al. |
| 2013/0131882 A1 | 5/2013 | Verfuerth et al. |
| 2013/0141904 A1 | 6/2013 | Verfuerth et al. |
| 2013/0169185 A1 | 7/2013 | Dai et al. |
| 2013/0176401 A1 | 7/2013 | Monari et al. |
| 2013/0193857 A1 | 8/2013 | Tlachac et al. |
| 2013/0229795 A1 | 9/2013 | Wang et al. |
| 2013/0257292 A1 | 10/2013 | Verfuerth et al. |
| 2013/0293117 A1 | 11/2013 | Verfuerth |
| 2013/0293877 A1 | 11/2013 | Ramer et al. |
| 2013/0308325 A1 | 11/2013 | Verfuerth et al. |
| 2014/0028199 A1 | 1/2014 | Chemel |
| 2014/0117852 A1 | 5/2014 | Zhai et al. |
| 2014/0252961 A1 | 9/2014 | Ramer et al. |
| 2014/0285090 A1 | 9/2014 | Chemel et al. |
| 2014/0285095 A1 | 9/2014 | Chemel et al. |
| 2014/0292208 A1 | 10/2014 | Chemel et al. |
| 2014/0293605 A1 | 10/2014 | Chemel et al. |
| 2014/0333222 A1 | 11/2014 | Chemel et al. |
| 2014/0375206 A1 | 12/2014 | Holland et al. |
| 2015/0008827 A1 | 1/2015 | Carrigan et al. |
| 2015/0008828 A1 | 1/2015 | Carrigan et al. |
| 2015/0061511 A1 | 3/2015 | Chemel et al. |
| 2015/0184842 A1 | 7/2015 | Chemel et al. |
| 2016/0014856 A1 | 1/2016 | Wacheux |
| 2016/0050725 A1 | 2/2016 | Johnston et al. |
| 2016/0302276 A1* | 10/2016 | Fushimi ............ H05B 33/0848 |
| 2016/0360594 A1 | 12/2016 | Chemel et al. |
| 2017/0019970 A1 | 1/2017 | Chemel et al. |
| 2017/0027045 A1 | 1/2017 | Chemel et al. |
| 2017/0042001 A1 | 2/2017 | Chemel et al. |
| 2017/0086279 A1 | 3/2017 | Chemel et al. |

FOREIGN PATENT DOCUMENTS

| | | |
|---|---|---|
| JP | 2006-106762 | 4/2006 |
| JP | 2007-045407 A | 2/2007 |
| WO | WO 96/20369 | 7/1996 |
| WO | WO 98/34206 A1 | 8/1998 |
| WO | WO 2007/003038 A1 | 1/2007 |
| WO | WO 2007/116332 A2 | 10/2007 |
| WO | WO 2009/003279 | 1/2009 |
| WO | WO 2009/129232 A1 | 10/2009 |
| WO | WO 2010/116283 A2 | 10/2010 |
| WO | WO 2012/061709 A1 | 5/2012 |
| WO | WO 2012/129243 A1 | 9/2012 |
| WO | WO 2013/067389 A1 | 5/2013 |
| WO | WO 2013/142292 A1 | 9/2013 |

OTHER PUBLICATIONS

Final Office Action in U.S. Appl. No. 14/267,368 mailed Dec. 31, 2015, 32 pages.
Notice of Acceptance for Australian Patent Application No. 2012332206, dated Jan. 21, 2016, 2 pages.

(56) References Cited

OTHER PUBLICATIONS

Office Action in U.S. Appl. No. 13/425,295, mailed Mar. 7, 2016, 16 pages.
Office Action in U.S. Appl. No. 14/294,081, mailed Mar. 14, 2016, 16 pages.
Patent Examination Report No. 1 for Australian Patent Application No. 2013235436, dated Jan. 18, 2016, 3 pages.
Search Report and Office Action in Chinese Patent Application No. 201380026132.5 dated Sep. 12, 2015, 36 pages (original Chinese and English translation).
"Enlightened Energy Management System," ETCC Open Forum, 13 pages. (Jul. 24, 2012).
Office Action in U.S. Appl. No. 12/817,425, mailed Mar. 23, 2016, 9 pages.
Office Action in U.S. Appl. No. 14/294,081, mailed Mar. 14, 2016, 20 pages.
Examination Report in European Patent Application No. 09732558.3, dated Apr. 19, 2016, 5 pages.
Second Office Action in Chinese Patent Application No. 201380026132.5, issued Apr. 20, 2016, 6 pages (w/English translation).
Examination Report in Australian Patent Application No. 2015255250, mailed Jun. 1, 2016, 3 pages.
Final Office Action in U.S. Appl. No. 13/425,295, mailed Mar. 7, 2016, 18 pages.
Advisory Action in U.S. Appl. No. 12/831,358, mailed Feb. 27, 2014, 2 pages.
Albeo Technologies, C Series, http://www.albeotech.com/?site_id=1500&item_id=161711, retrieved May 18, 2011, 2 pages.
Albeo Technologies, C3 Series, http://www.albeotech.com/?site_id=1500&item_id=173338, retrieved May 18, 2011, 2 pages.
Albeo Technologies, S Series, http://www.albeotech.com/?site_id=1500&item_id=161722, retrieved May 18, 2011, 2 pages.
Albeo Technologies, Surface Mounts, http://www.albeotech.com/?site_id=1500&item_id=161724, retrieved May 18, 2011, 2 pages.
Beta LED, 227 Series LED Canopy, http://www.betaled.com/us-en/TechnicalLibrary/TechnicalDocuments/227-series-canopy.aspx, retrieved May 18, 2011, 2 pages.
Beta LED, 227 Series LED Sofit, http://www.betaled.com/us-en/TechnicalLibrary/TechnicalDocuments/227-series-soffit.aspx, retrieved May 18, 2011, 2 pages.
Beta LED, 304 Series LED Interior, http://www.betaled.com/us-en/TechnicalLibrary/TechnicalDocuments/304-series-canopy.aspx, retrieved May 18, 2011, 2 pages.
Beta LED, 304 Series LED Parking Structure, http://www.betaled.com/us-en/TechnicalLibrary/TechnicalDocuments/304-series-parking.aspx, retrieved May 18, 2011, 2 pages.
Beta LED, 304 Series LED Sofit, http://www.betaled.com/us-en/TechnicalLibrary/TechnicalDocuments/304-series-soffit.aspx, retrieved May 18, 2011, 2 pages.
Beta LED, The Edge Canopy, http://www.betaled.com/us-en/TechnicalLibrary/TechnicalDocuments/TheEdgeCanopy.aspx, retrieved May 18, 2011, 2 pages.
Beta LED, The Edge LED Parking Structure, http://www.betaled.com/us-en/TechnicalLibrary/TechnicalDocuments/TheEdgeParking.aspx, retrieved May 18, 2011, 2 pages.
Color Kinetics, eW Cove EC Powercore line, http://www.colorkinetics.com/support/datasheets/eW_Cove_EC_Powercore_2700K_12in_SpecSheet.pdf, retrieved May 18, 2011, 2 pages.
Color Kinetics, eW Cove MX Powercore line, http://www.colorkinetics.com/support/datasheets/eW_Cove_MX_Powercore_2700K_Wide_Beam_Angle_SpecSheet.pdf, retrieved May 18, 2011, 2 pages.
Color Kinetics, eW Cove QLX Powercore line, http://www.colorkinetics.com/support/datasheets/eW_Cove_QLX_Powercore_6in_110degreex110degree.pdf, retrieved May 18, 2011, 2 pages.

Color Kinetics, eW Fuse Powercore line, http://www.colorkinetics.com/support/datasheets/eW_Fuse_Powercore_2700K_10degree_x_60degree.pdf, retrieved May 18, 2011, 2 pages.
Color Kinetics, eW Graze Powercore line, http://www.colorkinetics.com/support/datasheets/eW_Graze_Powercore_SpecSheet_2700K_10x60.pdf, retrieved May 18, 2011, 2 pages.
Examination Report in Australian Patent Application No. 2009236311, dated May 10, 2013, 3 pages.
Examination Report in Australian Patent Application No. 2011323165, dated Aug. 22, 2014, 3 pages.
Examination Report in Australian Patent Application No. 2012230991, dated Nov. 18, 2014, 3 pages.
Examination Report in Australian Patent Application No. 2012332206, dated Feb. 12, 2015, 3 pages.
Extended European Report and Opinion for European Appln No. EP 09732558.3, dated Aug. 23, 2012, 8 pages.
Extended European Report and Opinion for European Appln No. EP 12844864.4, dated Nov. 3, 2015, 8 pages.
Final Office Action in U.S. Appl. No. 12/817,425, mailed Sep. 15, 2014, 17 pages.
Final Office Action in U.S. Appl. No. 12/817,425, mailed Sep. 17, 2015, 9 pages.
Final Office Action in U.S. Appl. No. 13/425,295, mailed Jan. 2, 2015, 17 pages.
Final Office Action in U.S. Appl. No. 14/245,196, mailed May 27, 2015, 6 pages.
Final Office Action in U.S. Appl. No. 14/294,081, mailed Jun. 10, 2015, 13 pages.
Garg, Visha, et al., "Smart Occupancy Sensors to Reduce Energy Consumption," 32:1 Energy and Buildings 81-87, Jun. 2000, 7 pages (available at http://www.sciencedirect.com/science/article/pii/S0378778899000407).
International Preliminary Report on Patentability in International Application No. PCT/US2012/29834, dated Sep. 24, 2013, 7 pages.
International Preliminary Report on Patentability in International Application No. PCT/US2012/063372, dated May 6, 2014, 14 pages.
International Preliminary Report on Patentability in International Application No. PCT/US2013/031790, mailed Sep. 23, 2014, 10 pages.
International Preliminary Report on Patentability of PCT/US2009/040514, dated Oct. 19, 2010, 4 pages.
International Preliminary Report on Patentability of PCT/US2011/059334, dated May 7, 2013, 8 pages.
International Search Report and Written Opinion in International Application No. PCT/US2011/059334, mailed Feb. 2, 2012, 11 pages.
International Search Report and Written Opinion in International Application No. PCT/US2012/063372, mailed Mar. 19, 2013, 18 pages.
International Search Report and Written Opinion in International Application No. PCT/US2013/031790, mailed Jun. 3, 2013, 13 pages.
International Search Report and Written Opinion in International Application No. PCT/US2014/060095, mailed Jan. 29, 2015, 16 pages.
International Search Report and Written Opinion in International Application No. PCT/US2014/35990, mailed Sep. 18, 2014, 11 pages.
International Search Report and Written Report in International Application No. PCT/US12/29834, mailed Jul. 12, 2012, 10 pages.
International Search Report in International Application No. PCT/US2009/040514, mailed Jun. 26, 2009, 4 pages.
Notice of Acceptance in Australian Application No. 2009236311, dated Jun. 12, 2014, 2 pages.
Notice of Acceptance in Australian Patent Application No. 2011323165, dated Apr. 10, 2015, 2 pages.
Notice of Allowance in U.S. Appl. No. 12/423,543, mailed Feb. 8, 2012, 12 pages.
Notice of Allowance in U.S. Appl. No. 12/423,543, mailed Apr. 11, 2012, 8 pages.
Notice of Allowance in U.S. Appl. No. 12/423,543, mailed Jun. 21, 2012, 4 pages.

(56) References Cited

OTHER PUBLICATIONS

Notice of Allowance in U.S. Appl. No. 12/822,421, mailed Mar. 1, 2013, 9 pages.
Notice of Allowance in U.S. Appl. No. 12/822,577, mailed Mar. 15, 2013, 10 pages.
Notice of Allowance in U.S. Appl. No. 12/823,195, mailed Oct. 27, 2011, 7 pages.
Notice of Allowance in U.S. Appl. No. 12/823,195, mailed Dec. 12, 2011, 8 pages.
Notice of Allowance in U.S. Appl. No. 12/824,797, mailed Nov. 9, 2012, 8 pages.
Notice of Allowance in U.S. Appl. No. 12/827,209, mailed Jul. 14, 2015, 9 pages.
Notice of Allowance in U.S. Appl. No. 12/827,336, mailed Oct. 2, 2013, 12 pages.
Notice of Allowance in U.S. Appl. No. 12/827,397, mailed Oct. 29, 2012, 5 pages.
Notice of Allowance in U.S. Appl. No. 12/828,340, mailed Nov. 21, 2012, 5 pages.
Notice of Allowance in U.S. Appl. No. 12/828,495, mailed Feb. 19, 2014, 8 pages.
Notice of Allowance in U.S. Appl. No. 12/830,868, mailed Mar. 25, 2013, 9 pages.
Notice of Allowance in U.S. Appl. No. 12/830,868, mailed Jun. 24, 2013, 6 pages.
Notice of Allowance in U.S. Appl. No. 12/831,358, mailed Aug. 29, 2014, 9 pages.
Notice of Allowance in U.S. Appl. No. 12/831,476, mailed Jun. 11, 2014, 5 pages.
Notice of Allowance in U.S. Appl. No. 12/832,179, mailed Aug. 1, 2014, 9 pages.
Notice of Allowance in U.S. Appl. No. 12/832,211, mailed Apr. 23, 2014, 10 pages.
Notice of Allowance in U.S. Appl. No. 12/833,181, mailed May 23, 2013, 18 pages.
Notice of Allowance in U.S. Appl. No. 12/833,332, mailed Mar. 21, 2013, 8 pages.
Notice of Allowance in U.S. Appl. No. 13/289,492, mailed Jan. 23, 2015, 10 pages.
Notice of Allowance in U.S. Appl. No. 13/289,492, mailed Nov. 19, 2014, 9 pages.
Notice of Allowance in U.S. Appl. No. 14/045,679, mailed Feb. 20, 2014, 8 pages.
Notice of Allowance in U.S. Appl. No. 14/245,196, mailed Sep. 9, 2015, 8 pages.
Notice of Allowance in U.S. Appl. No. 14/245,196, mailed Sep. 23, 2015, 2 pages.
Notice of Allowance in U.S. Appl. No. 14/289,601, mailed Apr. 1, 2015, 9 pages.
Notice of Allowance in U.S. Appl. No. 14/289,601, mailed Jun. 4, 2015, 2 pages.
Notice of Allowance in U.S. Appl. No. 14/294,082, mailed May 19, 2015, 8 pages.
Office Action in Canadian Application No. 2,721,486, dated Jul. 14, 2015, 4 pages.
Office Action in U.S. Appl. No. 13/425,295, mailed Jun. 10, 2014, 12 pages.
Office Action in U.S. Appl. No. 12/423,543, dated Jun. 27, 2011, 14 pages.
Office Action in U.S. Appl. No. 12/817,425, mailed Apr. 30, 2012, 18 pages.
Office Action in U.S. Appl. No. 12/817,425, mailed Feb. 25, 2015, 6 pages.
Office Action in U.S. Appl. No. 12/817,425, mailed Mar. 27, 2014, 16 pages.
Office Action in U.S. Appl. No. 12/817,425, mailed Nov. 3, 2011, 14 pages.
Office Action in U.S. Appl. No. 12/817,425, mailed Sep. 10, 2013, 15 pages.
Office Action in U.S. Appl. No. 12/822,421, mailed Jan. 19, 2012, 20 pages.
Office Action in U.S. Appl. No. 12/822,421, mailed Sep. 12, 2012, 16 pages.
Office Action in U.S. Appl. No. 12/822,577, mailed Apr. 2, 2012, 25 pages.
Office Action in U.S. Appl. No. 12/822,577, mailed Oct. 11, 2012, 21 pages.
Office Action in U.S. Appl. No. 12/824,797, mailed Jun. 29, 2012, 5 pages.
Office Action in U.S. Appl. No. 12/827,209, mailed Jan. 10, 2014, 20 pages.
Office Action in U.S. Appl. No. 12/827,336, mailed Jun. 13, 2013, 6 pages.
Office Action in U.S. Appl. No. 12/827,336, mailed Oct. 4, 2012, 26 pages.
Office Action in U.S. Appl. No. 12/827,397, mailed Jul. 11, 2012, 6 pages.
Office Action in U.S. Appl. No. 12/828,340, mailed Jul. 2, 2012, 4 pages.
Office Action in U.S. Appl. No. 12/828,385, mailed Mar. 19, 2013, 12 pages.
Office Action in U.S. Appl. No. 12/828,385, mailed Sep. 12, 2012, 5 pages.
Office Action in U.S. Appl. No. 12/828,495, mailed Dec. 12, 2012, 21 pages.
Office Action in U.S. Appl. No. 12/828,495, mailed May 17, 2012, 6 pages.
Office Action in U.S. Appl. No. 12/828,495, mailed Mar. 28, 2013, 22 pages.
Office Action in U.S. Appl. No. 12/828,495, mailed Oct. 10, 2013, 25 pages.
Office Action in U.S. Appl. No. 12/830,868, mailed Aug. 13, 2012, 26 pages.
Office Action in U.S. Appl. No. 12/830,868, mailed Mar. 5, 2012, 5 pages.
Office Action in U.S. Appl. No. 12/831,358, mailed Jun. 13, 2013, 7 pages.
Office Action in U.S. Appl. No. 12/831,358, mailed Nov. 19, 2013, 16 pages.
Office Action in U.S. Appl. No. 12/831,476, mailed Apr. 11, 2012, 7 pages.
Office Action in U.S. Appl. No. 12/831,476, mailed Feb. 13, 2013, 42 pages.
Office Action in U.S. Appl. No. 12/831,476, mailed Jul. 23, 2013, 42 pages.
Office Action in U.S. Appl. No. 12/831,476, mailed Nov. 21, 2013, 52 pages.
Office Action in U.S. Appl. No. 12/831,476, mailed Oct. 17, 2012, 36 pages.
Office Action in U.S. Appl. No. 12/832,179, mailed Feb. 21, 2014, 16 pages.
Office Action in U.S. Appl. No. 12/832,179, mailed Jul. 17, 2013, 15 pages.
Office Action in U.S. Appl. No. 12/832,179, mailed Mar. 13, 2013, 13 pages.
Office Action in U.S. Appl. No. 12/832,179, mailed Sep. 12, 2012, 5 pages.
Office Action in U.S. Appl. No. 12/832,211, mailed Jun. 20, 2013, 12 pages.
Office Action in U.S. Appl. No. 12/832,211, mailed Oct. 2, 2013, 13 pages.
Office Action in U.S. Appl. No. 12/832,211, mailed Sep. 12, 2012, 4 pages.
Office Action in U.S. Appl. No. 12/833,181, mailed Sep. 12, 2012, 5 pages.
Office Action in U.S. Appl. No. 12/833,332, mailed Aug. 20, 2012, 5 pages.
Office Action in U.S. Appl. No. 12/833,332, mailed Nov. 23, 2012, 5 pages.
Office Action in U.S. Appl. No. 13/289,492, mailed Aug. 5, 2014, 29 pages.

(56) References Cited

OTHER PUBLICATIONS

Office Action in U.S. Appl. No. 13/289,492, mailed Feb. 27, 2014, 28 pages.
Office Action in U.S. Appl. No. 13/425,295, mailed Jun. 29, 2015, 17 pages.
Office Action in U.S. Appl. No. 14/267,386, mailed Aug. 10, 2015, 27 pages.
Office Action in U.S. Appl. No. 14/267,386, mailed Apr. 17, 2015, 30 pages.
Office Action in U.S. Appl. No. 14/289,601, mailed Jan. 30, 2015, 6 pages.
Office Action in U.S. Appl. No. 14/294,081, mailed Jan. 22, 2015, 7 pages.
Office Action in U.S. Appl. No. 14/294,082, mailed Jan. 2, 2015, 10 pages.
"Progress Report: Reducing Barriers to Use of High Efficiency Lighting Systems," Rensselaer Polytechnic Institute Lighting Research Center, Oct. 2001, 108 pages. (available at http://www.lrc.rpi.edu/researchAreas/reducingBarriers/pdf/year1FinalReport.pdf).
Restriction Requirement in U.S. Appl. No. 12/817,425, mailed Dec. 10, 2014, 6 pages.
Restriction Requirement in U.S. Appl. No. 14/294,081, mailed Oct. 9, 2014, 6 pages.
Vainio, A.M., et al., "Learning and Adaptive Fuzzy Control System for Smart Home," *Developing Ambient Intelligence*, Ch. 3, pp. 28-47 (Springer 2006) (available at http://www.springerlink.com/content/ll72k320064qx81/fulltext.pdf).
Written Opinion in International Application No. PCT/US2009/040514, dated Jun. 26, 2009, 3 pages.
ZigBee Alliance, "Wireless Sensors and Control Networks: Enabling New Opportunities with ZigBee" (PowerPoint presentation by Bob Heile, Chairman, ZigBee Alliance), Dec. 2006, 53 pages.
ZigBee Alliance, "ZigBee-200y Layer Pics and Stack Profile," Jun. 2008, 119 pages.
ZigBee Alliance, "Notice of Use and Disclosure," Jan. 17, 2008, 602 pages.
Final Office Action in U.S. Appl. No. 14/294,081 dated Oct. 5, 2016, 20 pages.
Examination Report No. 1 dated Oct. 14, 2016 in Australian Patent Application No. 2015203026, 2 pages.
Communication pursuant to Article 94(3) EPC, issued by the European Patent Office for Application No. 12761180.4, dated Jan. 27, 2017, 5 pages.
Communication pursuant to Article 94(3) EPC, issued by the European Patent Office for Application No. 13763788.0, dated Apr. 4, 2017, 5 pages.
European Search Report issued by the European Patent Office for Application No. 14852889.6, dated May 19, 2017, 8 pages.
Examination Report No. 1 issued by the Australian Patent Office for Application No. 2014259974, dated Apr. 3, 2017, 3 pages.
Examination Report No. 1 issued by the Australian Patent Office for Application No. 2016206250, dated May 1, 2017, 3 pages.
Examination Report No. 2 issued by the Australian Patent Office for Application No. 2015203026, dated May 16, 2017, 3 pages.
Extended European Search Report issued by the European Patent Office for Application No. 11838876.8, dated Apr. 11, 2017, 8 pages.
Final Office Action in U.S. Appl. No. 12/817,425 dated Dec. 15, 2016, 10 pages.
International Search Report and Written Opinion dated Oct. 14, 2016 in International Application No. PCT/US2016/043893, 14 pages.
Non-Final Office Action in U.S. Appl. No. 14/645,548, dated May 4, 2017, 20 pages.
Non-Final Office Action in U.S. Appl. No. 14/927,413, dated May 5, 2017, 12 pages.
Non-Final Office Action in U.S. Appl. No. 15/175,725, dated Jun. 1, 2017, 14 pages.
Non-Final Office Action in U.S. Appl. No. 14/294,081, dated Jun. 15, 2017, 15 pages.
Notice of Acceptance issued by the Australian Patent Office for Application No. 2014218445, dated Jul. 15, 2016, 2 pages.
Notice of Acceptance issued by the Australian Patent Office for Application No. 2015255250, dated Jan. 24, 2017, 3 pages.
Notice of Acceptance issued by the Australian Patent Office for Application No. 2013235436, dated Nov. 16, 2016, 2 pages.
Notification of Fulfilling of Registration Formality issued by the Patent Office of the People's Republic of China for Application No. 201380026132.5, dated Aug. 3, 2016 (English Translation), 2 pages.
Office Action in U.S. Appl. No. 14/518,831 dated Dec. 30, 2016, 51 pp.
Office Action issued by the Canadian Patent Office for Application No. 2721486, dated Oct. 14, 2016, 4 pages.
Supplementary European Search Report dated Nov. 28, 2016 in European Application No. EP 14 79 1232, 6 pages.
Examination Report issued by the Canadian Patent Office for Application No. 2,830,991, dated Jul. 13, 2017, 3 pages.
Examination Report issued by the European Patent Office for Application No. 12844864.4, dated Aug. 16, 2017, 3 pages.
Examination Report No. 1 issued by the Australian Patent Office for Application No. 2016202824, dated Jul. 17, 2017, 6 pages.
Examination Report No. 1 issued by the Australian Patent Office for Application No. 2017201414, dated Jun. 6, 2017, 3 pages.
Non-Final Office Action in U.S. Appl. No. 12/817,425, dated Aug. 3, 2017, 17 pages.
Non-Final Office Action in U.S. Appl. No. 15/298,064, dated Aug. 11, 2017, 15 pages.
Notice of Allowance in U.S. Appl. No. 14/518,831, dated Aug. 21, 2017, 13 pages.
Office Action issued by the European Patent Office for Application No. 12 761 180.4, dated Aug. 24, 2017, 5 pages.

* cited by examiner

METHODS, SYSTEMS, AND APPARATUS FOR PROVIDING VARIABLE ILLUMINATION

CROSS-REFERENCE TO RELATED PATENT APPLICATIONS

This application is a continuation of and claims priority to U.S. application Ser. No. 14/245,196, filed is Apr. 4, 2014, now U.S. Pat. No. 9,241,392, entitled "METHODS, SYSTEMS, AND APPARATUS FOR PROVIDING VARIABLE ILLUMINATION," which is a continuation of and claims priority to U.S. application Ser. No. 14/045,679, filed Oct. 3, 2013, now U.S. Pat. No. 8,729,833, entitled "METHODS, SYSTEMS, AND APPARATUS FOR PROVIDING VARIABLE ILLUMINATION," which claims priority, as a bypass continuation under 35 U.S.C. §120, to PCT/US2013/031790, filed on Mar. 14, 2013, which claims the benefit, under 35 U.S.C. §119(e), of:

U.S. Provisional Patent Application No. 61/612,580, filed on Mar. 19, 2012, entitled "Lighting Fixture";

U.S. Provisional Patent Application No. 61/697,635, filed on Sep. 6, 2012, entitled "Digital Light Agent;" and U.S. Provisional Patent Application No. 61/762,592, filed on Feb. 8, 2013, entitled "Digital Light Agent." Each of these applications is hereby incorporated herein by reference in its respective entirety.

BACKGROUND

Intelligent lighting systems combine solid-state light sources, embedded sensors and controls, and low-cost pervasive networking to create an integrated illumination system which is highly responsive to its environment. Benefits of some or all such systems may include, but are not limited to, a much higher quality of light tailored specifically to user needs and significant energy savings compared to legacy lighting system technologies.

SUMMARY

Embodiments of the present invention include a system for providing variable illumination to an environment. In one embodiment, the system includes at least one digital control ready (DCR) lighting fixture, disposed in a first location of the environment, to provide the variable illumination to at least a portion of the environment, and at least one digital light agent (DLA), disposed in a second location of the environment and operably coupled to the at least one DCR lighting fixture, to control the at least one DCR lighting fixture in response to at least one change in the environment.

In at least one embodiment, the DCR lighting fixture comprises a fixture housing that contains and/or supports at least one light source (e.g., one or more light-emitting diodes (LEDs)), at least one light source driver, an alternating current (AC) power input, a power converter, a power meter, and a fixture input/output bus. In operation, the light source generates the variable illumination in response to the digital control signal from the DLA. The light source driver, which is operably coupled to the light source, powers the light source according to the digital control signal, using AC power from the AC power input, which is operably coupled to the light source driver and the power converter. The power converter converts the AC power to direct current (DC) power at a voltage of less than or equal to +60 V (e.g., +40 VDC, +24 VDC, or +12 VDC) for powering the DLA. The power meter, which may be coupled to the light source driver, the AC power input, and/or the power converter, measures the DCR lighting fixture's power consumption. And the fixture input/output bus, which is operably coupled to the light source, the power converter, and the power meter, receives the digital control signal from the DLA and provides at least one digital reporting signal representative of the DCR lighting fixture's power consumption and/or light output to the DLA. For instance, this digital reporting signal may include information about the DCR lighting fixture's power consumption, energy consumption, AC power quality, color temperature, light intensity, and/or temperature. The fixture input/output bus also provides DC power to the DLA.

In certain embodiments, the DLA includes a DLA housing that holds and/or supports at least one sensor (e.g., an occupancy sensor, a temperature sensor, an ambient light level sensor, and a clock), a memory, a processor, a DLA input/output bus, and a network interface (e.g., an antenna). In operation, the sensor provides at least one sensor signal representative of change(s) in the environment, such as changes in occupancy, ambient light level, temperature, time, etc. The memory stores at least one rule governing a change in the variable illumination provided by the DCR lighting fixture based on the change(s) in the environment. The processor, which is operably coupled to the sensor and to the memory, generates the digital control signal based on the rule(s) and the sensor signal and transmits the digital control signal to the DCR lighting fixture via the DLA input/output bus. The DLA input/output bus also receives the digital reporting signal and the DC power from the DCR lighting fixture. And the network interface, which is operably coupled to the processor, provides data representative of the digital reporting signal, the digital control signal, and/or sensor signal to a user.

Some embodiments of the inventive lighting systems include a cable that connects the fixture input/output bus to the DLA input/output bus. This cable and the input/output buses may be compatible with a local interconnect network (LIN) standard, a controller area network (CAN) standard, a KNX standard, and/or a digital addressable lighting interface (DALI) standard. In some cases, the lighting system includes a second DCR lighting fixture operably coupled to the DLA via a second cable and, optionally, a third DCR lighting fixture operably coupled to the DLA via a third cable coupled to the second DCR lighting fixture.

Examples of the fixture input/output bus and the DLA input/output bus may each comprise: a respective power port for the second portion of the DC power; a respective common port for a reference voltage level; and at least one respective data port for the at least one digital reporting signal and the at least one digital control signal. The fixture input/output bus and the DLA input/output bus may each be compatible with a local interconnect network (LIN) standard, a controller area network (CAN) standard, a KNX standard, and/or a digital addressable lighting interface (DALI) standard.

Exemplary DCR lighting fixtures may also include at least one sensor and a processor coupled to the sensor. The sensor measures at least one fixture parameter, such as a temperature of the light source (e.g., LED), a light source bias voltage, a light source operating current, a light source color temperature, and/or a light source color. The processor receives this fixture parameter measurement from the sensor and transmits a measurement signal representative of the fixture parameter to the DLA via a data port in fixture input/output bus.

Additional embodiments of the present invention include a method of illuminating an environment with variable illumination from at least one DCR lighting fixture disposed in a first location within the environment. One example of this method comprises sensing at least one change in the environment (e.g., a change in occupancy, environmental temperature, and/or ambient light level) at a DLA disposed in a second location within the environment. The DLA or other processor determines a change in the variable illumination from the DCR lighting fixture based at least in part on the change in the environment and generates a digital control signal based at least in part on this change in the variable illumination. The DLA transmits this digital control signal to the DCR lighting fixture via at least one cable connected to an input/output bus.

The DLA may also receive (DC) electrical power from the DCR lighting fixture via the cable and the input/output bus, e.g., at a voltage of less than or equal to +40 VDC, +24 VDC, +12 VDC, etc. The DLA may also receive a digital reporting signal representative of the DCR lighting fixture's power consumption via the cable and the input/output bus. In these cases, the DLA or other processor may determine the change in the variable illumination based at least in part on the DCR lighting fixture's power consumption. And the DLA may transmit data representative of the DCR lighting fixture's power consumption via an antenna or other wireless link.

For purposes of the present disclosure, the term "ambient light" refers to visible radiation (i.e., radiation whose wavelength is between about 450 nm and about 700 nm) that pervades a given environment or space. In other words, ambient light is the soft, indirect light that fills the volume of the environment and is perceptible to a person within the environment.

Similarly, the term "ambient light level" refers to the illuminance, or luminous flux on a surface per unit area. The illuminance is a measure of how much the incident light illuminates the surface, wavelength-weighted by the luminosity function to correlate with human brightness perception. Luminous flux may be measured in lux (lumens per square meter) or foot-candles.

The following U.S. published applications are hereby incorporated herein by reference:

U.S. Pat. No. 8,138,690, issued Feb. 29, 2012, filed Jun. 25, 2010, and entitled "LED-BASED LIGHTING METHODS, APPARATUS, AND SYSTEMS EMPLOYING LED LIGHT BARS, OCCUPANCY SENSING, LOCAL STATE MACHINE, AND METER CIRCUIT";

U.S. Pat. No. 8,232,745, issued Jul. 31, 2012, filed Apr. 14, 2009, and entitled "MODULAR LIGHTING SYSTEMS";

U.S. Pat. No. 8,339,069, issued Dec. 25, 2012, filed Jun. 30, 2010, and entitled "POWER MANAGEMENT UNIT WITH POWER METERING";

U.S. Pre-Grant Publication No. 2010-0296285-A1, published Nov. 25, 2010, filed Jun. 17, 2010, and entitled "SENSOR-BASED LIGHTING METHODS, APPARATUS, AND SYSTEMS EMPLOYING ROTATABLE LED LIGHT BARS";

U.S. Pre-Grant Publication No. 2010-0301773-A1, published Dec. 2, 2010, filed Jun. 24, 2010, and entitled "LED-BASED LIGHTING METHODS, APPARATUS, AND SYSTEMS EMPLOYING LED LIGHT BARS OCCUPANCY SENSING, AND LOCAL STATE MACHINE";

U.S. Pre-Grant Publication No. 2010-0302779-A1, published Dec. 2, 2010, filed Jun. 24, 2010, and entitled "LED-BASED LIGHTING METHODS, APPARATUS, AND SYSTEMS EMPLOYING LED LIGHT BARS, OCCUPANCY SENSING, LOCAL STATE MACHINE, AND TIME-BASED TRACKING OF OPERATIONAL MODES";

U.S. Pre-Grant Publication No. 2010-0264846-A1, published Oct. 21, 2010, filed Jun. 28, 2010, and entitled "POWER MANAGEMENT UNIT WITH ADAPTIVE DIMMING";

U.S. Pre-Grant Publication No. 2010-0295473-A1, published Nov. 25, 2010, filed Jun. 30, 2010, and entitled "LED LIGHTING METHODS, APPARATUS, AND SYSTEMS INCLUDING RULES-BASED SENSOR DATA LOGGING";

U.S. Pre-Grant Publication No. 2010-0301768-A1, published Dec. 2, 2010, filed Jun. 30, 2010, and entitled "LED LIGHTING METHODS, APPARATUS, AND SYSTEMS INCLUDING HISTORIC SENSOR DATA LOGGING";

U.S. Pre-Grant Publication No. 2012-0235579, published Sep. 20, 2012, filed Mar. 20, 2012, and entitled "METHODS, APPARATUS AND SYSTEMS FOR PROVIDING OCCUPANCY-BASED VARIABLE LIGHTING";

U.S. Pre-Grant Publication No. 2012-0143357, published Jun. 7, 2012, filed Nov. 4, 2011, and entitled "METHOD, APPARATUS, AND SYSTEM FOR OCCUPANCY SENSING";

WO 2012/061709, published May 10, 2012, filed Nov. 4, 2011, and entitled "METHOD, APPARATUS, AND SYSTEM FOR OCCUPANCY SENSING";

WO 2012/129243, published Sep. 27, 2012, filed Mar. 20, 2012, and entitled "METHODS, APPARATUS AND SYSTEMS FOR PROVIDING OCCUPANCY-BASED VARIABLE LIGHTING"; and PCT/US2012/63372, filed Nov. 2, 2012, and entitled "METHODS, APPARATUS AND SYSTEMS FOR INTELLIGENT LIGHTING."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Following below are more detailed descriptions of various concepts related to, and embodiments of, inventive systems, methods, and apparatus for providing variable illumination with digital control ready lighting fixtures. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Networked Lighting Systems

Figure 1:
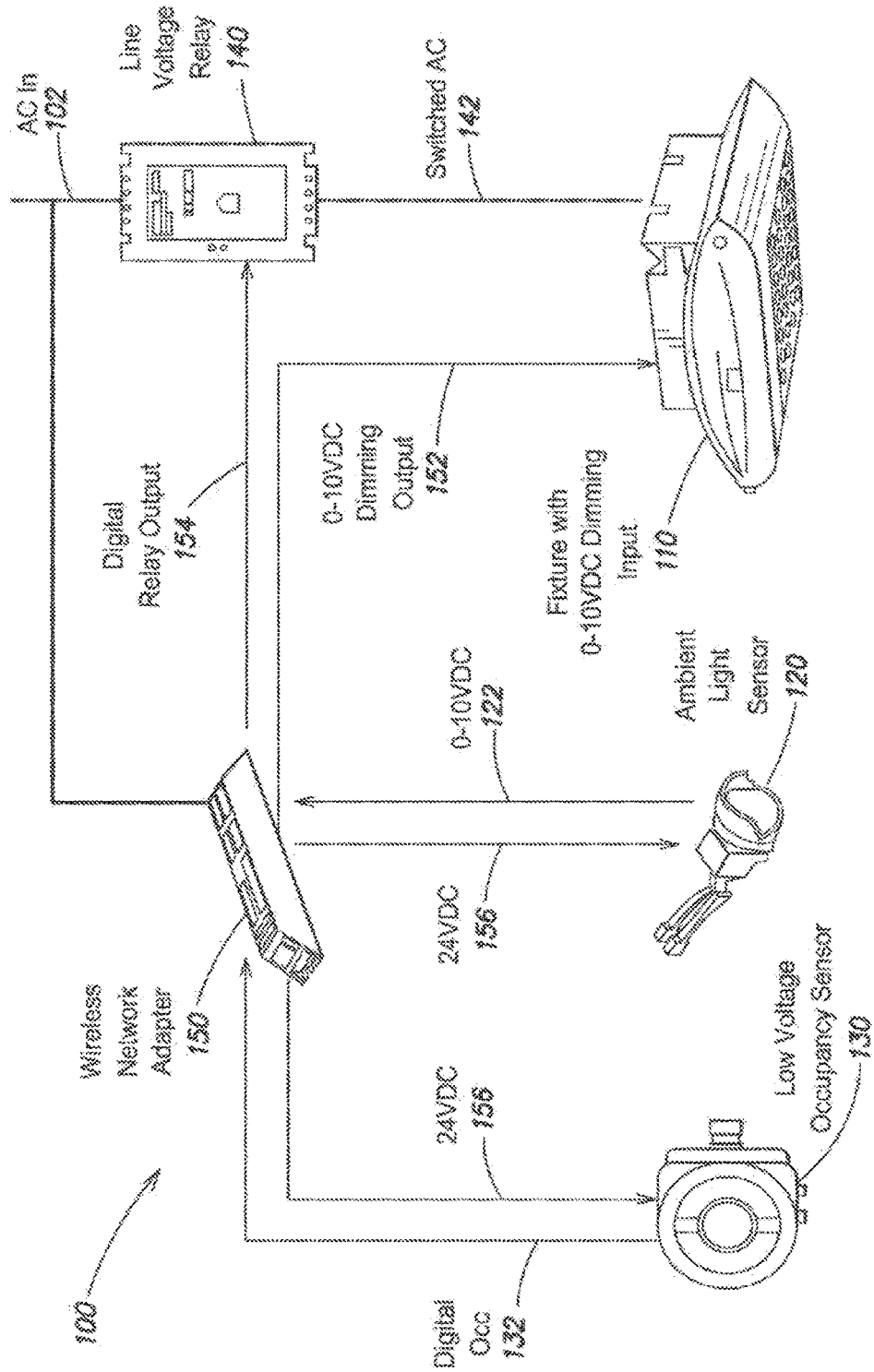
FIG. 1 illustrates a conventional intelligent lighting system.

FIG. 1 shows a networked lighting system 100 suitable for illuminating a warehouse, cold-storage facility, office space, retail space, sports venue, school, residential area, outdoor space, correctional facility, industrial facility, or other environment. The networked lighting system 100 provides variable illumination at higher efficiencies and lower costs that conventional lighting systems. It can also be customized for energy management, safety, and aesthetic appeal.

The networked lighting system 100 includes one or more lighting fixtures 110, each of which includes one or more light sources, such as light-emitting diodes (LEDs), fluorescent bulbs, etc. Each lighting fixture 110 is powered by switched alternating current (AC) power 142 from a line voltage relay 140. As understood by those of ordinary skill in the art, the line voltage relay 140 contains at least one switch (not shown) that can be opened and closed to turn the switched AC power 142 off and on, respectively.

Each lighting fixture 110 is also operably coupled to a respective wireless network adapter 150 via a radio-frequency cable, an fiber optic link, a wireless infrared link, or a radio-frequency wireless link (e.g., a ZigBee link). In some cases, a single wireless network adapter 150 may be coupled to more than one lighting fixture 110; in other cases, the networked lighting system 100 include one (dedicated) wireless network adapter 150 for each lighting fixture 110.

The wireless network adapter 150 is powered by an AC power input 102 (e.g., 100-277 VAC, 50/60 Hz) and coupled to an ambient light sensor 120 and a low-voltage occupancy sensor 130 via wired or wireless links. The wireless network adapter 150 includes one or more transformers that transform the AC input power 102 into direct current (DC) power suitable for powering the ambient light sensor 120 and the occupancy sensor 130. In this case, the wireless network adapter 150 supplies 24 VDC power 156 to both the ambient light sensor 120 and the occupancy sensor 130.

The ambient light sensor 120 monitors the ambient light level in the environment illuminated by the lighting fixture 110 and provides a 0-10 VDC analog ambient light level signal 122 representative of the amount of light that it detects. Similarly, the occupancy sensor 130 monitors the occupancy of the environment illuminated by the lighting fixture 110 and provides a digital occupancy signal 132 (e.g., a 5 V transistor-transistor logic signal) representative of whether or not the environment is occupied.

The wireless network adapter 150 receives the ambient light level signal 122 and the occupancy signal 132 from the ambient light sensor 120 and the occupancy sensor 130, respectively, and processes them according to one or more rules stored in a memory (not shown). These rules govern the networked lighting system's response to changes in the ambient light level, occupancy, time of day, day of the week, ambient temperature, lighting fixture temperature, energy consumption, and/or other parameters that characterize the illuminated environment. A processor (not shown) in the wireless network adapter 150 implements a state machine that evaluates changes in the lighting fixture's output based on the sensor signals and the rules. For instance, if the wireless network adapter 150 receives an ambient light level signal 122 that indicates an increase in ambient light level and senses that the lighting fixture 110 is operating at 70% of its maximum rated output, the wireless network adapter 150 may reduce the lighting fixture's output to 60% of its maximum rated output. If the wireless network adapter 150 receives a "high" occupancy signal 132 after hours and senses that there is no appreciable ambient light and that the lighting fixture 110 is off, it may turn the lighting fixture 110 to operate at 25% of its maximum rated output.

The wireless network adapter 150 controls the lighting fixture 110 by adjusting an analog 0-10 VDC dimming signal 152 that determines the lighting fixture's output illumination level. Assuming no hysteresis or response non-linearity, the lighting fixture's output illumination level varies linearly with the amplitude of the dimming signal: 10 VDC produces the maximum illumination, 9 VDC produces 90% of the maximum illumination, and so on. Because the dimming signal 152 is an analog signal, it must be supplied continuously for as long as the lighting fixture 110 is supposed to emit light at the desired output level. In addition, different fixtures respond differently to the same analog dimming signal, which makes it difficult to standardize control hardware like the wireless network adapter 150. Even a given fixture may respond differently to the same analog dimming signal under different environmental conditions (e.g., temperature) and at different points in it useful life. To compensate for these variations, the wireless network adapter 150 may have to be calibrated (and periodically recalibrated) to the fixture 110, which can be time consuming and expensive.

The wireless network adapter 150 can also turn the entire lighting fixture 110 on and off. As shown in FIG. 1, the wireless network adapter 150 supplies a digital relay output 154 to the line voltage relay 140 that supplies switched AC power 142 to the lighting fixture 110. If the wireless network adapter 150 determines that there is no reason to illuminate the environment (e.g., there is no occupancy and the illuminated facility is closed), it can turn off the switched AC power 142 by transmitting a digital relay output 154 that causes the switch in the line voltage relay to open. This reduces the lighting fixture's power consumption to zero; not even standby power is applied to the lighting fixture. It also gives the wireless network adapter 150 coarse control of the lighting fixture's power consumption.

Digital Control Ready (DCR) Intelligent Lighting Systems

Figure 2A:
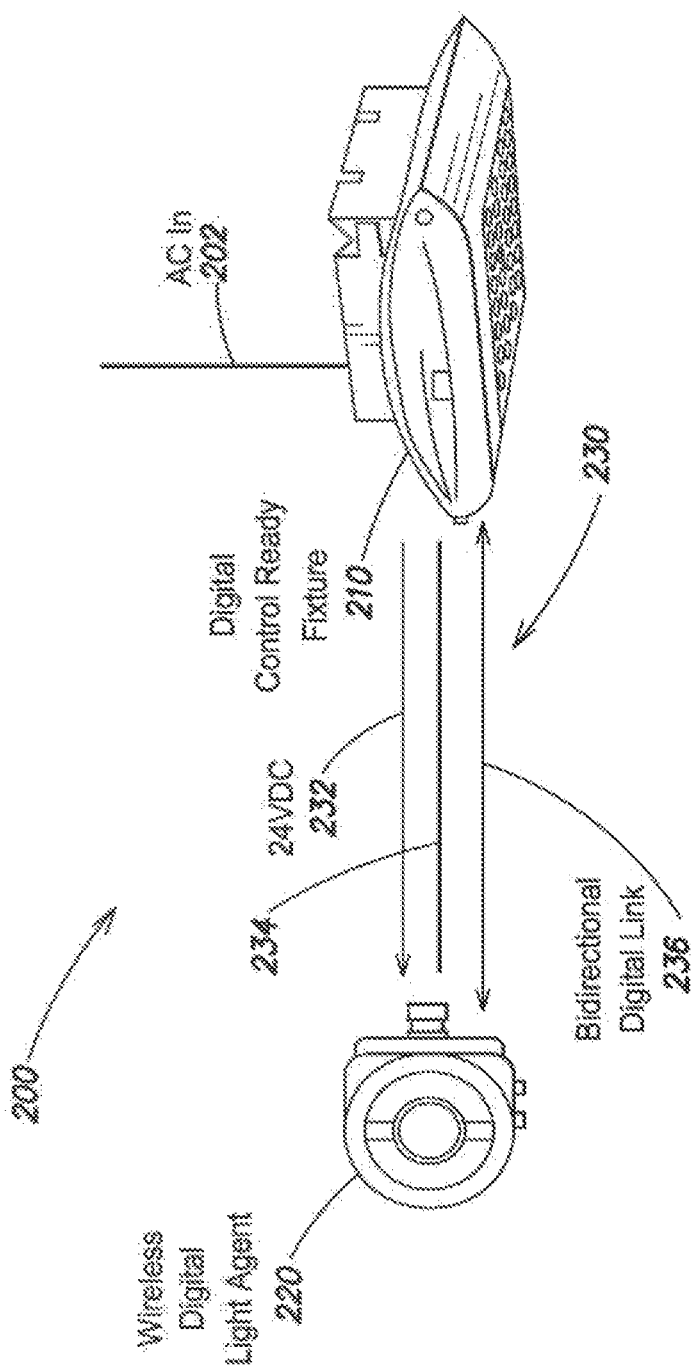
FIG. 2A illustrates an intelligent lighting system with a digital control ready (DCR) lighting fixture coupled to a DCR digital light agent (DLA) according to embodiments of the present invention.

FIG. 2A shows an intelligent lighting system 200 that uses a two-way open standard for controlling and managing next-generation fixtures known as the Digital Control Ready (DCR) standard. The DCR standard is a simple, extensible, and low-cost way to add energy-efficient and feature-rich functionality to any lighting fixture or lighting system (e.g., lighting system 200). Compared to other networked lighting systems, which may have many specialized, expensive components, the DCR intelligent lighting system 200 shown in FIG. 2A may be simpler and less expensive to install and operate. It may also be more easily expanded and more flexible than other networked lighting systems.

Using the DCR standard, a "dumb" DCR lighting fixture 210 can be transformed into an intelligent fixture capable of occupancy detection, daylight harvesting, task tuning, 0-100% digital dimming, and wireless control and management via a separate wireless digital lighting agent (DLA) 220. The DLA 220 connects to a gateway, server, or other central management device (not shown) via a network interface, such as an antenna, free-space optical transceiver, wired connection, or fiber optic link. Because the DLA 220 is separate from the DCR lighting fixture 210, its antenna can be positioned to send and receive signals over a longer range, with better signal fidelity, and/or with lower transmit powers. In addition, the DLA's network interface (antenna) enables remote control of the DCR lighting fixture 210, e.g., using an interface accessible from a networked device like a computer or smartphone.

The DCR lighting fixture 210 is network-agnostic at the control layer and communicates using a bi-directional digital data link instead of a 0-10 VDC analog dimming input. The DCR lighting fixture 210 is also "energy-aware": it meters and reports its power and energy consumption via the data link. And it provides DC power (e.g., 24 VDC power from a class 2 output) to power modular control accessories, including the DLA 220.

In the intelligent lighting system 200 shown in FIG. 2A, the DCR lighting fixture 210 is coupled to the DLA 220 via a DCR cable 230, which includes a power wire 232, a common (ground) wire 234, and a bidirectional data interface 236. The DCR lighting fixture 210 provides DC power to the DLA 220 via the power wire 232 and the common wire 234 at a voltage 60 VDC, 40 VDC, 24 VDC, 12 VDC, 9 VDC, 5 VDC, or any other suitable voltage. The DCR lighting fixture 210 generates this DC power using one or more transformers (not shown) to transform AC power from an AC input line 202 into DC power.

The DCR lighting fixture 210 exchanges information with the DLA 220 via the bidirectional data interface 236, which may include one or more wires in the cable. In some cases, the data interface 236 may include a single wire that supports time-multiplexed communication between the DCR lighting fixture 210 and the DLA 220. The data interface 236 may also include one or more wires that carry signals from the DCR lighting fixture 210 to the DLA 220 and one or more wires that carry signals from the DLA 220 to the DCR lighting fixture 210.

As understood by those of skill in the art, the power wire 232, the common wire 234, and the bidirectional data link 236 may each include a conductive wire (e.g., a solid or multi-strand metal wire) surround by a coaxial insulating layer, such as a concentric piece of solid plastic or rubber. If desired, the wires may also be at least partially encased by separate metal shields or a common metal shield and an outer protective layer. Suitable physical standards for producing DCR cables 230 include, but are not limited to the local interconnect network (LIN) standard, the controller area network (CAN) standard, the KNX standard, and the digital addressable lighting interface (DALI) standard. For example, the DCR cable 230 may conform to a suitable common standard, such as the RJ-45 standard, and be terminated with suitable connectors, such as RJ-45 connectors, RJ-11 connectors, terminal blocks, or any other suitable type of connector.

Like other networked lighting systems, the intelligent lighting system 200 shown in FIG. 2A is suitable for illuminating a warehouse, cold-storage facility, office space, retail space, sports venue, school, residential area, outdoor space, correctional facility, industrial facility, or other environment. In operation, one or more light sources (e.g., LEDs) in the DCR lighting fixture 210 provide variable illumination according to digital control signals from the DLA 220. Because the DCR lighting fixture 210 responds to digital control signals rather than analog control signals, it produces light with more uniformly and more consistently than conventional (analog) fixtures. Light output also varies less from fixture to fixture for a given digital control signal. The use of digital signaling also eliminates the need for separate digital-to-analog adapters.

Unlike conventional fixtures, the DCR lighting fixture 210 measures its power consumption, energy consumption (e.g., over a given period), operating temperature, commanded light level, actual light level, command color temperature, actual color temperature, color (chromaticity), output spectrum, remaining LED lifetime, etc., and reports these measurements to the DLA 220 on a periodic, as-needed, or as-commanded basis. This bidirectional communication can be used to implement closed-loop feedback control for more precise lighting.

The DCR lighting fixture 210 may also report identifying information to the DLA 220 (and/or to a fixture adapter as discussed below) via the bidirectional digital link 236. For instance, the DCR lighting fixture 210 may transmit its serial number, model number, make, network address, physical location, or any other identification information to the DLA 220, e.g., in response to a query from DLA 220, upon being powered up, on a periodic basis, or on any other suitable basis or timeline. The DCR lighting fixture 210 may also transmit information about its configuration or capabilities, including but not limited to its maximum and minimum light output levels; its maximum and minimum rated power consumption; its color temperature and color temperature range; the number and orientation of the lighting modules in the lighting fixture; and the number, type, and expected lifetime of the light sources (e.g., LEDs) in the lighting modules. Again, the DCR lighting fixture 210 may transmit this information to the DLA 220 in response to a query from DLA 220, upon being powered up, on a periodic basis, as part of a periodic "health check" broadcast, or on any other suitable basis or timeline.

The DLA 220 receives and processes the measurements from the DCR lighting fixture 210. It also monitors the illuminated environment for changes in occupancy, ambient light level, temperature, etc. with one or more occupancy, ambient light level, and temperature sensors. The DLA 220 may also receive commands and/or data from other sources, including a central controller, other DLAs, and other DCR lighting fixtures, via a network interface, such as an antenna. The DLA 220 evaluates this information according to one or more rules stored in memory (not shown). Each of these rules govern a transition between a pair of the intelligent lighting network's (or DCR lighting fixture's) possible operating states. For a given current operating state, there may a finite number of possible next operating states, with the transition from the current operating state to a particular next operating state determined by a change in the environmental conditions and/or the DCR lighting fixture's operating parameters.

If the DLA 220 determines that the DCR lighting fixture's operating state should change (e.g., its light output should go down because it is consuming too much power), it transmits a digital control signal to the DCR lighting fixture 210 that represents the DCR lighting fixture's new operating state. This digital control signal may include bits (e.g., 4, 8, 16, 32, or 64 bits) representing the DCR lighting fixture's light (dimming) level, color temperature, color, output spectrum, target power consumption, maximum power consumption, or any other fixture parameter. The DCR lighting fixture 210 adjusts its operating state in response to this digital control signal, e.g., to a different light output level or color temperature. Because the command signal is digital, not analog, it does not have to be transmitted continuously—a single transmission is enough.

The DLA 220 may also reprogram the DCR lighting fixture 210 via the bidirectional data link 236. For instance, the DLA 220 may update firmware used by the DCR lighting fixture 220. It may also load calibration data or look-up table data used by the DCR lighting fixture 210 to convert the digital command signals from the DLA 220 into voltage and/or current settings for driving the various components and modules in the DCR lighting fixture 210, such as LED drivers for LEDs that provide the illumination. In addition, the DLA 220 may set one or more of the DCR lighting fixture's "persistent" operating parameters, such as maximum power or illumination levels.

Controlling Multiple DCR Lighting Fixtures

Figure 2B:
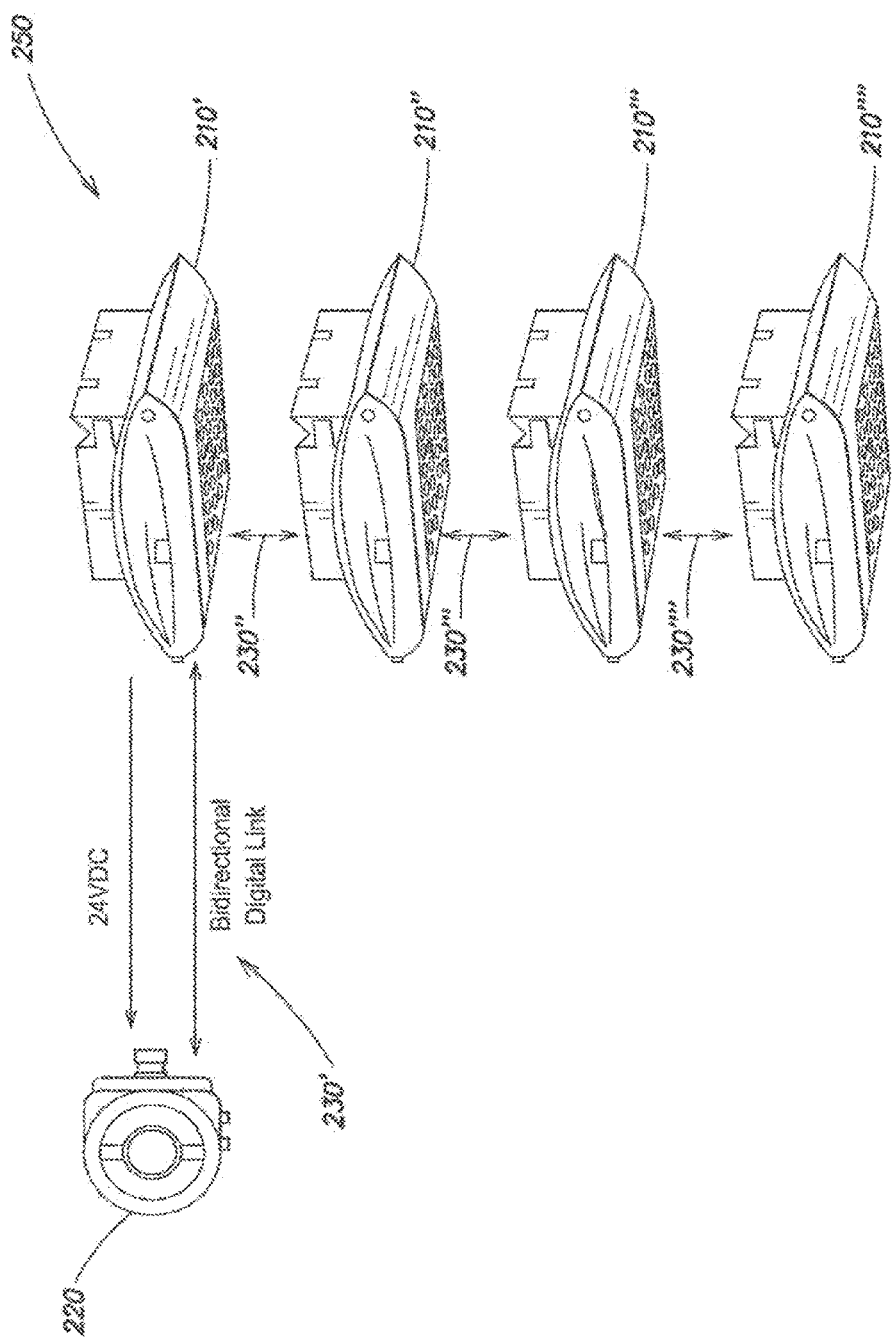
FIG. 2B illustrates a DLA that controls multiple DCR lighting fixtures via a daisy-chain connection according to embodiments of the present invention.

FIG. 2B illustrates a DCR-enabled networked lighting system 250 that includes several DCR lighting fixtures 210', 210", 210''', and 210'''' (collectively, fixtures 210) controlled by a single DLA 220. The DLA 220 is connected to the first DCR lighting fixture 210' via a first DCR cable 230', just as in the system 200 shown in FIG. 2A. The second fixture 210" is connected to the first fixture 210' via a second DCR cable 230" or other suitable bi-directional data link, the third fixture 210' is connected to the second fixture 210" via a third DCR cable 230', and so on. In other words, the fixtures 210 are daisy-chained to the DLA 220 using respective DCR cables 230', 230", 230''', 230'''' (collectively, DCR cables 230).

As discussed above, the first DCR cable 230' carries DC power as well as data from the first fixture 210' to the DLA 220. This data may include data passed on from the other fixtures 210 in the daisy chain, including information about the fixtures' current operating states, respective power consumption, and network health. This information may be passed up the daisy chain, e.g., from the third fixture 210''' to the second fixture 210" and so on, with each successive fixture 210 simply routing the information rather than analyzing or processing it in any way. The upstream data may be addressed or marked with header information that signifies its origin (e.g., the third fixture 210').

The first DCR cable 230' also carries digital control signals from the DLA 220 to the first fixture 210', which acts on commands that affect its operating state and transmits commands addressed to other fixtures 210 down the daisy chain via the other cables 230. These digital control signals may include broadcast messages that affect every fixtures 210 in the network 250 (e.g., "power off" or "increase light output") as well as messages targeted to a particular fixture 210 or group of fixtures 210. These fixture-specific messages may be based on localized environmental changes, such as detected activity (motion), predicted motion, or changes in ambient light levels (e.g., more light coming through a particular window or skylight) in a particular section of the illuminated environment. The second and subsequent cables 230 may or may not carry DC power between the fixtures 230 depending on the fixtures' particular power requirements and available power supplies.

Digital Control Ready (DCR) Lighting Fixtures

Figure 3:
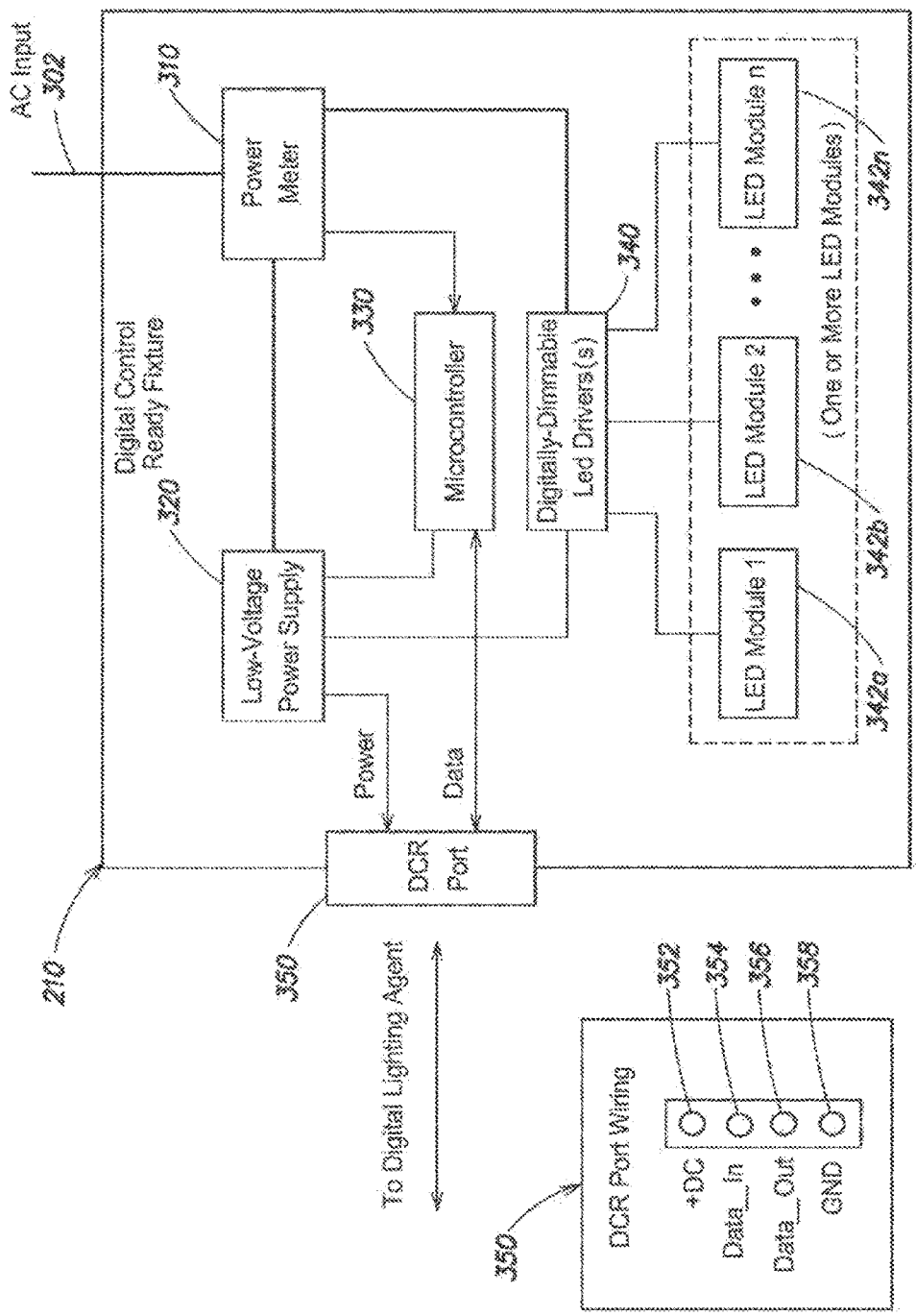
FIG. 3 illustrates a DCR lighting fixture according to embodiments of the present invention.

FIG. 3 is a block diagram of the DCR lighting fixture 210 shown in FIG. 2A. The DCR lighting fixture 210 includes a power meter 310, a low-voltage power supply 320, a processor (microcontroller 330), one or more LED drivers 340, and a DCR interface (port) 350. It also includes one or more LED modules 342a, 342b, 342n (collectively, LED modules 342), each of which includes one or more LEDs. The LED modules 342 consume power and emit light according to digital control signals received by the microcontroller 330 from the DLA 220 (FIG. 2A) via the DCR port 350, which may conform to the RJ-45 standard. In some cases, the DCR lighting fixture 210 may have additional DCR ports 350, e.g., to support daisy-chain connections as shown in FIG. 2B or to support connection to other DCR-enabled devices.

The power meter 310 is coupled to an AC input 302 that receives line AC power from an external source. The power meter 310 may be implemented in hardware or software and measures the power consumed by the DCR lighting fixture 100. By way of non-limiting example, the power meter 310 may include a Cirrus CS5490 two-channel energy measurement integrated circuit that provides high-accuracy energy measurement, on-chip energy calculations, and fast on-chip calibration. It may also count or integrate the amount of energy consumed by the DCR lighting fixture 100 over a given period (e.g., over the most recent billing interval or since the last query or report). Some examples of the power meter 310 may also track how much power is consumed by each component or module in the fixture 210. For instance, the power meter 310 may measure how much power (and energy) is consumed by the low-voltage supply 320, the microcontroller 330, and the LED driver(s) 340.

The power meter 310 supplies the power consumption data and the energy consumption data to the microcontroller 330, which reports the data to the DLA 220 (FIG. 2A) via the DCR port 350, which includes a +DC port 352, a data input port 354, a data output port 356, and a ground port 358. The microcontroller 330 also reports other data about the fixture's operating state, such as its operating temperature, the color temperature of the LEDs, the actual LED output (which may be measured with a photosensor coupled to the microcontroller 330), and indications of malfunctions (e.g., error messages). It reports this information by generating and transmitting one or more digital signals to the DLA 220 (not shown) via a data output port 356 in the DCR port 350. The microcontroller 330 may report some or all of this data to the DLA 220 at regular intervals (e.g., every hour), when commanded to by the DLA 220, in response to predetermined events (e.g., at power-up, power-off, or in the event of a component failure).

The microcontroller 330 also receives, processes, and carries out digital control signals from the DLA 220. For instance, if the microcontroller 330 receives a digital control signal indicating a desired change in the light level or color temperature provided by the LED modules 342, it actuates the LED driver(s) 340 so as to provide the desired light level. The LED driver(s) 340 respond(s) to this actuation by increasing or decreasing the current provided to the LED modules 342, which in turn causes the light level to increase or decrease, respectively. The microcontroller 330 may also actuate the LED driver(s) 340 so as to actuate the color temperature, color, beam angle, number of beams, beam footprint(s), etc. of the beams of light emitted by the LED modules 342.

As mentioned above, the DCR lighting fixture 210 also provides DC power to the DLA 220 via a +DC port 352 in the DCR interface 350. This power is generated by the low-voltage power supply 320, which receives AC power from the AC input 302 via the power meter 310. The low-voltage power supply 320 includes at least one AC-DC converter to transform the AC power into DC power suitable for powering the DLA 220, the microcontroller 330, the LED driver(s) 340, and the other electronic components in the DCR lighting fixture 210. The low-voltage power supply 320 may also include one or more DC-DC converters to step up or down the DC voltage from the AC-DC converter as desired.

DCR Digital Light Agents

Figure 4:
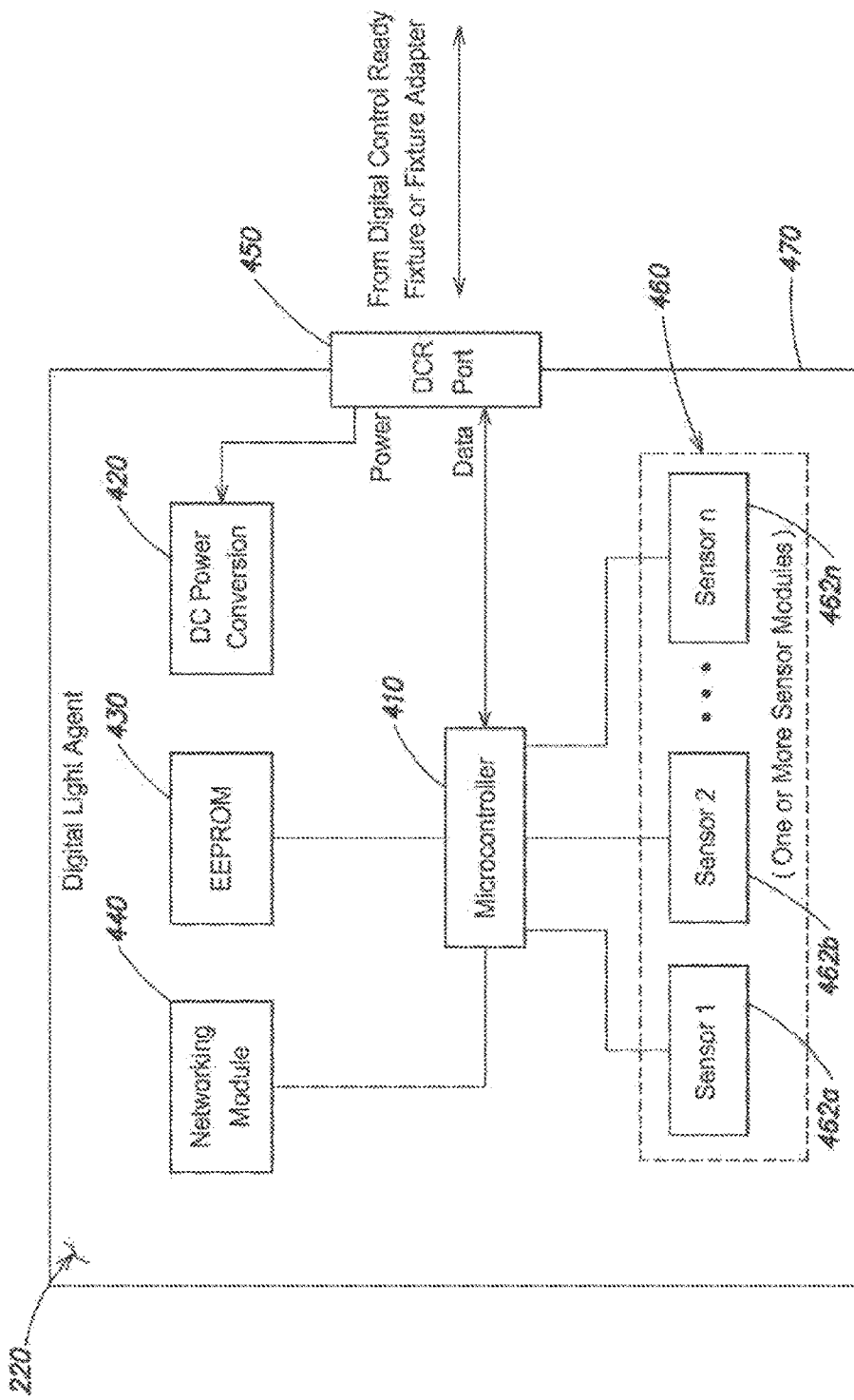
FIG. 4 illustrates a DLA according to embodiments of the present invention.

FIG. 4 is a schematic diagram of the digital light agent (DLA) 220 shown in FIG. 2A. Embodiments of the DLA 220 can be made from low-cost, commodity hardware and feature compact and flexible designs for easy installation. For instance, the DLA 220 may have electrical and mechanical connections that make it possible to upgrade an existing fixture in a matter of minutes. Once installed, the DLA 220 provides intelligent occupancy control, task tuning, and daylight harvesting for reduced power consumption.

The DLA 220 includes a processor (microcontroller 410), a DC power converter 420, a electrically erasable programmable read-only memory (EEPROM) 430, a networking module 440, a DCR interface 450, and an extensible sensor bus 460 that holds one or more integrated sensors 462a, 462b, . . . 462n (collectively, sensors 462) disposed within a housing 470. As understood by those of ordinary skill in the art, these electronic components may be operably coupled together via electrical connections (conductive traces) or optical connections (free-space or waveguide links).

The DCR interface 450 is configured to receive DC power and data and to transmit data to a DCR lighting fixture 210 (FIG. 2A) or other DCR-compatible component via a DCR cable 230. As described above, the DCR port includes a DC voltage port (e.g., +12 VDC to +24 VDC), a common port, and one or more data ports. Power received via the DCR port 450 flows to the DC power converter 420, which steps up or down the received DC voltage to voltage levels suitable for powering the microcontroller 410, memory 430, sensors 462, and other electronic components in the DLA 220.

The sensors 462 may include but are not limited to an occupancy sensor 462a (e.g., a dual-element passive infrared occupancy sensor), a digital ambient light sensor 462b, an internal temperature sensor, an external temperature sensor, a real-time clock, and a power meter (e.g., a utility-grade power meter). These sensors 462 detect environmental conditions associated with the environment illuminated by the fixture 210 and/or the network 200 and conditions of the DLA 220 itself. If desired, one or more of the sensors 462 may be optically coupled to respective lenses for improved sensing capabilities. These lenses may be chosen based on the DLA's position within the illuminated environment. For instance, the lenses may provide wide-area coverage for high-bay and outdoor mounting, narrower coverage for mid-bay mounting, etc.

The sensors 462, including the occupancy sensor 462a and the ambient light sensor 462b, can be calibrated so as to adapt the lighting network's performance to specific characteristics of the environment. For instance, the occupancy sensor 462a may be calibrated so as to provide different degrees of responsiveness for people and vehicles. Similarly, the ambient light sensor 462b may be calibrated to account or compensate for variations in reflectivity of surfaces in the environment, the presence of obstructions between the sensor 462b and windows or skylights, etc. The DLA 220 may carry out one or more of these calibrations internally, e.g., based on information about the sensor 462 (e.g., sensor element, lens, amplifier, etc.) derived by or provided to the microcontroller 410. The DLA 220 may also be calibrated manually or via external command based on sensor measurements of known stimuli (e.g., known ambient light levels or known occupancy profiles). Sensor calibration can be automated and/or continuous (e.g., as implemented with open-loop feedback derived from sensor data). It can also be carried discretely (e.g., during installation or routine maintenance) using handheld calibration tools, software, push-button interfaces on the DLA 220, etc.

The DLA 220 may also use data from the ambient light sensor 462b to perform aging/depreciation compensation of the DCR lighting fixture's LEDs. To do this, the DLA 220 tracks the relationship between the commanded light level and the detected light level over time, possibly by storing records (data) about the commanded and detected light levels in the EEPROM 430. The DLA 220 either analyzes this data itself or transmits the data via the networking module 440 to an external processor or management module for analysis. In either case, the analysis involves determining changes in the detected light level for a given commanded light level. In other words, the DLA 220 or external processor determines how much light the DCR lighting fixture 210 should be generating, and how much it actually is generating, and adjusts the calibration constants in the DCR lighting fixture 210 accordingly. Lighting level changes on short time scales (e.g., minutes, hours, or days) may indicate environmental changes, whereas more gradual changes may indicate LED degradation, sensor degradation, or both. Abrupt changes in the detected light level for a given commanded light level may represent either environmental changes or component failures. In some cases, these changes can be disambiguated with data from other sensors (e.g., the occupancy sensor 462a), components, or user input.

The microcontroller 410 may log sensor data and fault information from the DLA's electronic components and the lighting fixture 210 (FIG. 2A) in the memory 430. For instance, the microcontroller 410 may log occupancy data as a function of time for later analysis of occupancy and traffic patterns in the illuminated environment. It may also log and analyze longer-term changes, such as changes in average ambient light level with the time of year. This data may be analyzed, either on-board the DLA 220 or remotely, to adjust operation of the lighting system 200, e.g., so as to reduce power consumption, improve safety, etc.

The microcontroller 410 may also use real-time and logged sensor to control the DCR fixture 210 so as to provide light only when and where it is needed, dramatically reducing lighting-related energy usage. For instance, the occupancy sensor 462a may provide, to the microcontroller 410, a multi-bit digital signal that represents the number of occupants, the types of occupant (e.g., vehicles or people), and the occupants' trajectories (e.g., no movement, straight-line movement, etc.) in the environment illuminated by the lighting system 200. The microcontroller 410 responds to this multi-bit signal by generating one or more digital control signals according to rules stored in the memory and transmits the digital control signal(s) to the DCR lighting fixture 210 (FIG. 2A) via the DCR port 450 (e.g., an RJ-45 port).

Similarly, the microcontroller 410 may command the DCR lighting fixture 210 to change state based on changes in the ambient light level detected by the digital ambient light sensor 462b. In some cases, the DLA 220 may implement "daylight harvesting" by reducing the amount of light provided by the fixture 210 when the ambient light level increases. In other words, the DLA 220 may automatically dim the light fixture 210 when the amount of sunlight (or light from other sources) increases so as to maintain a constant light level in the environment illuminated by the lighting system 200. This real-time feedback allows for precise control of delivered light in dynamic conditions.

The DLA 220 may also generate digital command signals that provide lighting that is tuned to a particular task undertaken by an occupant of the illuminated environment. This type of lighting control and management, which is known as "task tuning," involves using the ambient light sensor 462b embedded in the DLA 220 to allow a user to customize delivered light levels to the specific task at hand. Because most spaces (environments) are overlit by design, this typically results in substantial savings. For example, the user may set the desired light level (e.g., 30 ft-cd) at a particular task height (e.g., rack height) or task surface (e.g., the surface of a desk) using an interface (e.g., a web browser or smartphone app) that is communicatively coupled to the DLA 220. The DLA 220 responds to this instruction by adjusting the illumination provided by the DCR fixture 210 to provide the desired light level using closed-loop feedback provided by ambient light level measurements from the ambient light sensor 462b. In some cases the DLA 220 may employ a calibrated transfer function to map the measured ambient light level(s) to the light level at the task height as disclosed in PCT/US2012/63372, filed Nov. 2, 2012, and entitled "METHODS, APPARATUS AND SYSTEMS FOR INTELLIGENT LIGHTING," which is incorporated herein by reference in its entirety.

Daylight harvesting, occupancy-based lighting, and other task- and environmental-based lighting behavior can be controlled and adjusted dynamically using instructions (software) stored in the memory 430 coupled to the microcontroller 410. For example, these instructions may cause the microcontroller 410 to implement a state machine based on rules governing the system's response to changing environmental and system parameters. They may also cause changes in illumination based on a schedule provided by a facility user or operator. The instructions stored in the memory 430 may be augmented, updated, or overwritten with instructions from a server, gateway, or other central management module communicatively coupled to the DLA 220 via the networking module 440. In addition, the networking module 440 may receive instructions for real-time control of the lighting fixture 210, the DLA 220, and/or any other part of the lighting system 200. The networking module 440 may also serve as a node in a wireless mesh network or multi-hop wireless network.

As understood by those of ordinary skill in the art, the networking module 440 may include a radio-frequency (rf) antenna (not shown) for wireless communication with a ZigBee/IEEE 802.15.4 link, Wi-Fi router, wireless gateway, or other suitable wireless device. In some cases, the antenna is disposed within the housing 470, which can be thin and permeable enough at rf wavelengths not to impede wireless communication. In other cases, at least part of the antenna protrudes through the housing 470 to prevent undesired attenuation or interference with signals transmitted and received by the antenna.

The networking module 440 may also be used to commission the DLA 220 after installation. For instance, the DLA 220 may be configured wirelessly using a cross-platform (Win/Mac) commissioning tool application (not shown) coupled with a USB ZigBee radio. This wireless toolkit allows installers and/or end users to: assign a name or address to the fixture for identification purposes; set the active and inactive light levels; set a timeout for the occupancy sensor 462a; and set ambient light targets for active and inactive states. If desired, the user can calibrate the ambient light sensor 462b use the commissioning tool application and a separate (e.g., handheld) light meter or photodetector. This calibration may be used to fine-tune or augment the DLA's factory calibration, which may encompass using software and hardware to calibrate the DLA's software-based power estimator. The user may also use the commissioning tool application to download logged data, including event history and energy usage, and update the firmware stored in the memory 430.

As mentioned above, the DLA's electronic components may be disposed within a housing 470 The housing's physical form factor may be based on PCA spatial requirements, sensor lens constraints, and desired wireless antenna coverage. For example, the housing 470 may be shaped for surface mounting, mounting in a recessed junction box enclosure, or mounting on a conduit to a lighting fixture 210. In one embodiment, it is about 11 cm high by 11 cm wide by 3.0 cm in deep. It may be injection-molded or otherwise formed from a polymeric material, such as acrylonitrile butadiene styrene (ABS) polymer, that is tough, resistant to impact and heat, and conforms with the appropriate fire and electrical safety standards. The housing 470 may protect the DLA's electronic components well enough to sustain operation over a temperature range of about −40° C. to about 50° C. and a humidity range of about 0% to about 95%.

DCR Intelligent Lighting Systems with Conventional Lighting Fixtures

Figure 5A:
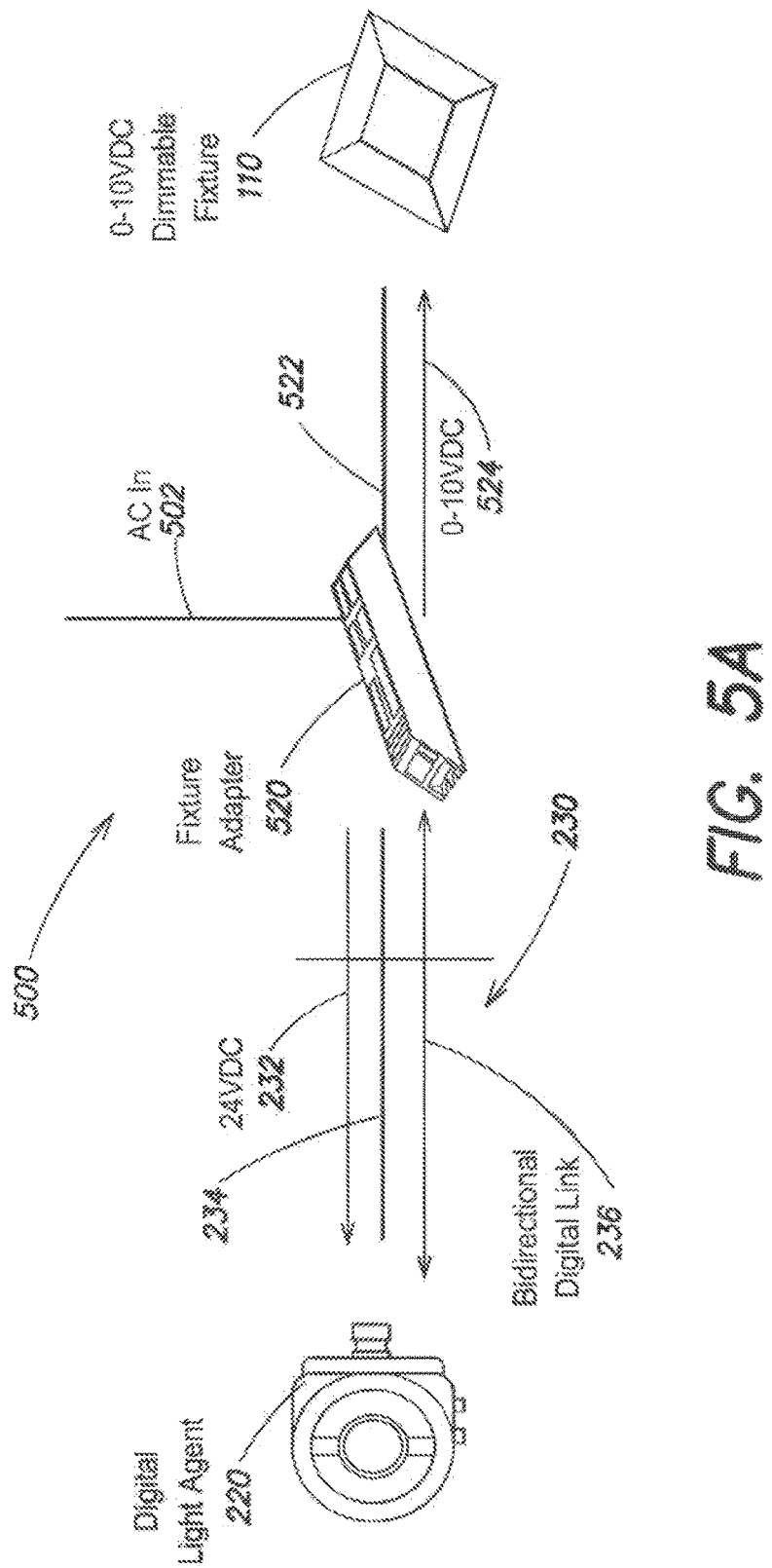
FIG. 5A illustrates an intelligent lighting system with a conventional lighting fixture coupled to a DLA via a DLA fixture adapter (DLAFA) according to embodiments of the present invention.

FIG. 5A is a diagram of a DCR networked lighting system 500 that includes a conventional dimmable lighting fixture 110 (described above with respect to FIG. 1). The conventional fixture 110 is operably coupled to a DLA 220 via a DCR digital light agent fixture adapter (DLAFA) 520. The DLA 220 is connected to the fixture adapter 520 via a DCR cable 230, and the DLAFA is operably connected to the conventional fixture 110.

As shown in FIG. 5A, the fixture adapter 520 transforms the conventional fixture 110 into a DCR fixture from the perspective of the DLA 220. The fixture adapter 520 transforms AC power from an AC input 502 into DC power (e.g., at +60, +40, +24, +12, +9, or +5 VDC), which it supplies to the DLA 220. The fixture adapter 520 also supplies switched AC power to the conventional fixture 110 via an AC line 522 connecting the fixture adapter 520 to the fixture 110.

In addition, to supplying power, the fixture adapter 520 monitors the fixture's power consumption, energy consumption, etc. It reports this data to the DLA 220 via the DCR cable 230 as described above with respect to FIG. 2A. The fixture adapter 520 also receives digital control signals from the DLA 220 and uses them to generate 0-10 VDC analog dimming signals suitable for controlling the intensity of the light emitted by the lighting fixture 110.

Figure 5B:
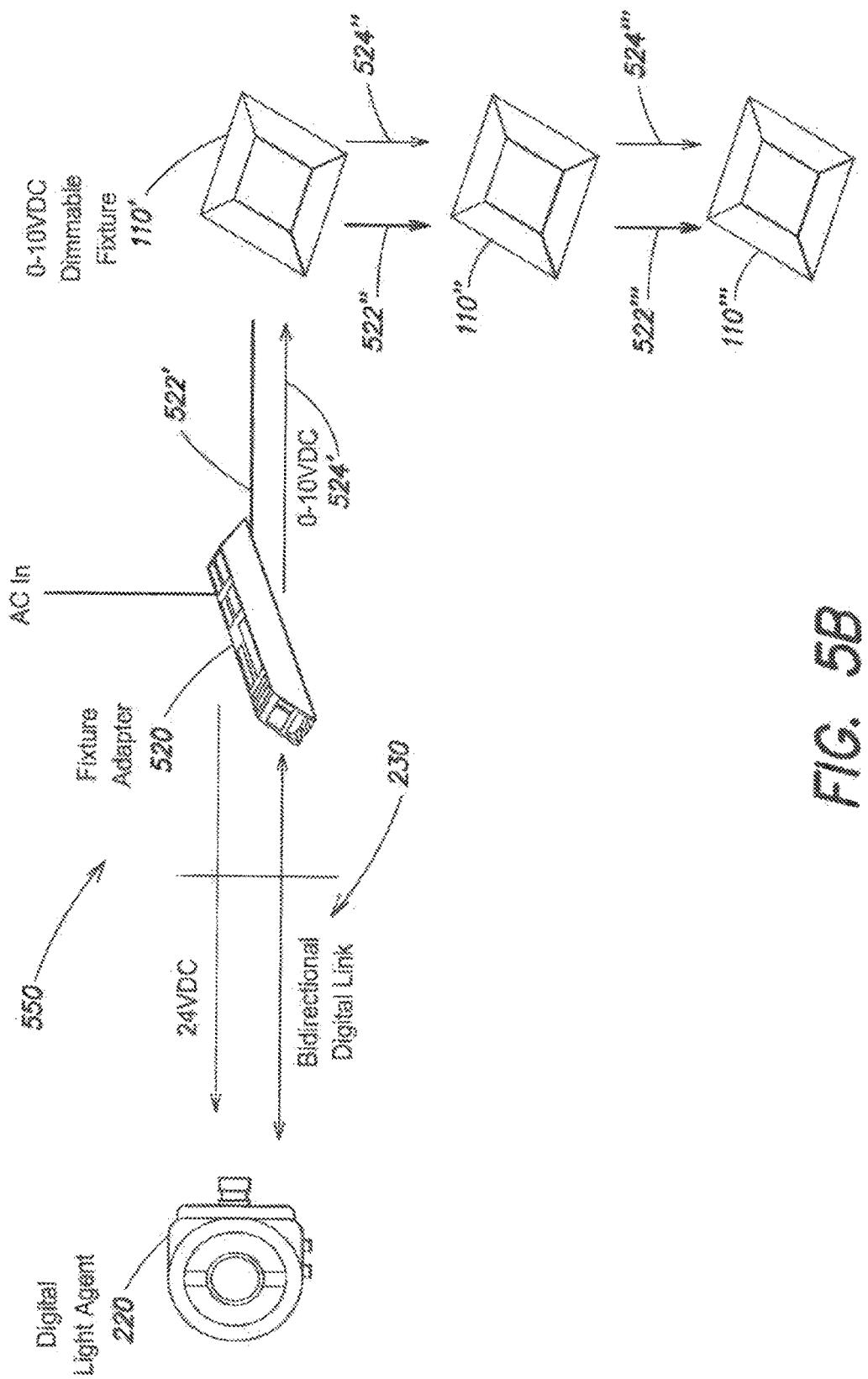
FIG. 5B illustrates a DLA that controls multiple DCR lighting fixtures via DLAFA in a daisy-chain connection with the DCR lighting fixtures according to embodiments of the present invention.

Like the DLA 220 shown in FIG. 2B, a DLAFA can used to control more than one conventional lighting fixture 110 at a time. For instance, FIG. 5B illustrates a networked lighting system 550 that includes several conventional lighting fixtures 110', 110", and 110'" (collectively, fixtures 110) controlled by a single DLA 220 via a single fixture adapter 520. In this particular configuration (i.e., one DLA 220 connected to one fixture adapter 520, which is connected in turn to many conventional fixtures 110), the fixture adapter 520 provides a single analog dimming signal that causes all of the connected fixtures 110 to dim simultaneously to the same dimming/light level. The fixture adapter 520 provides the analog dimming signal and switched AC power to the first lighting fixture 110' via a first power line 522' and a first analog control line 524', just as in the system 500 shown in FIG. 5A. The second fixture 110" is connected to the first fixture 110' via a second power line 522" and a second analog control line 524", and so on. In other words, the fixtures 110 are daisy-chained to the fixture adapter 520 using respective AC power lines 522', 522", and 522'" (collectively, AC power lines 522) and respective analog control lines 524', 524", and 524'" (collectively, analog control lines 524).

DCR Digital Light Agent Fixture Adapter (DLAFA)

Figure 6:
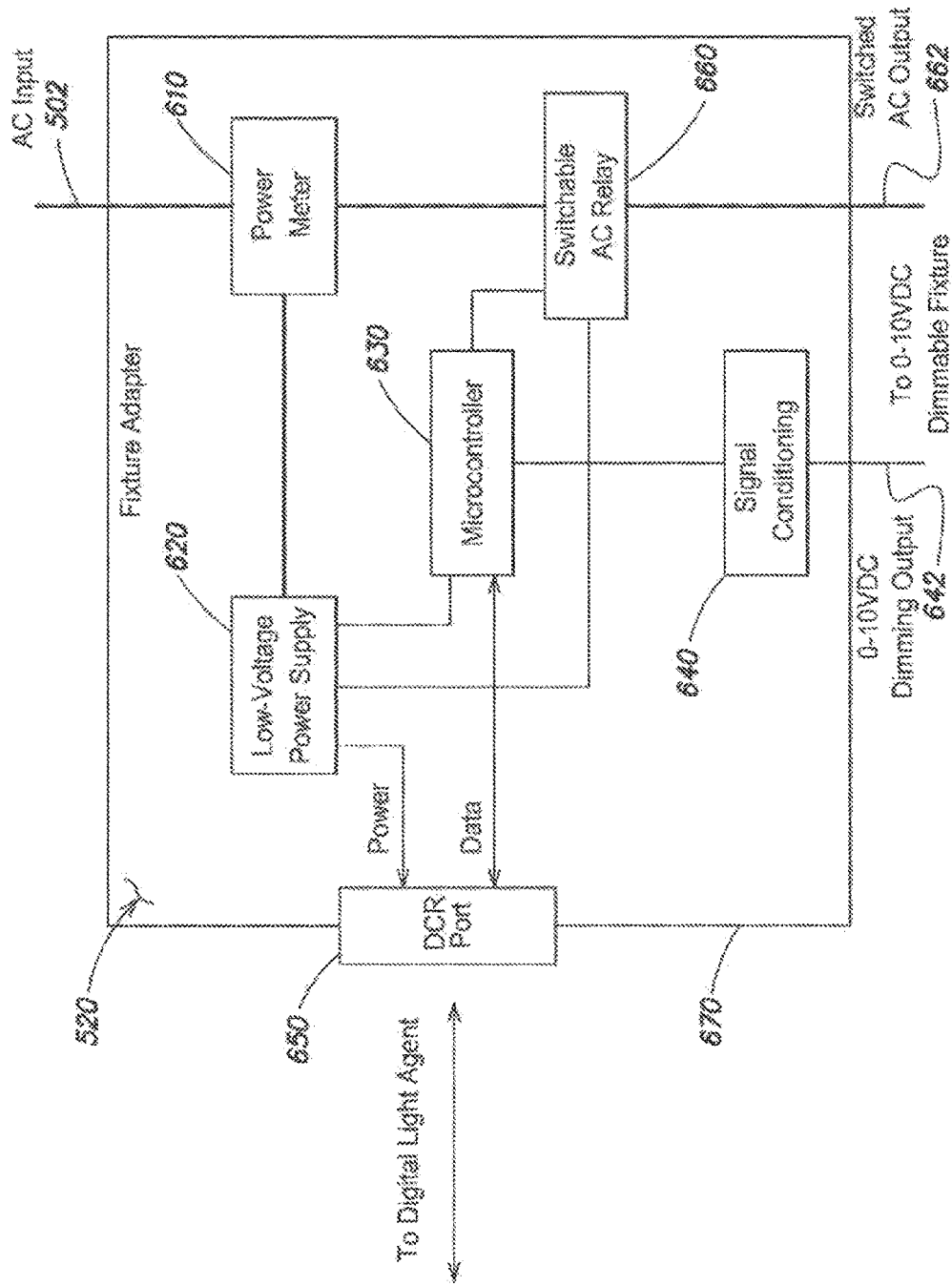
FIG. 6 illustrates a digital light agent fixture adapter (DLAFA), or smart power pack, suitable for use with a DCR lighting fixture according to embodiments of the present invention.

FIG. 6 is a block diagram of the fixture adapter 520 used in the networked lighting systems 500 and 550 of FIGS. 5A and 5B, respectively. The fixture adapter 520 includes a power meter 610, a low-voltage power supply 620, a processor (microcontroller 630), a signal conditioning block 640, at least one DCR port 650 (e.g., two DCR ports 650), and a switchable AC relay 660 all disposed within a housing 670. The power meter 610 is coupled to the AC input 502 and provides utility-grade power metering for turning lights into managed energy resources. It measures and records the amount of power consumed by the fixture adapter 520 and the amount of switched AC power provided to the lighting fixtures 110 via a switched AC power output 662, which may comprise AC line, neutral, ground, and switched connections. It also provides AC power to the switchable AC relay 660 and to the low-voltage power supply 620, which transforms the AC power into DC power (e.g., about +12 VDC to about +24 VDC) for powering the DLA 220 via the DCR port 650.

The DCR port 650, which may be an RJ-45 compatible connector, also transmits data to connected DCR-compatible control modules like the DLA 220. The transmitted data includes power consumption information from the power meter 610, as well as possibly information about the health of the fixture 110, the fixture adapter 520, and the network. For instance, the fixture adapter 520 may report faults in its own circuitry to the DLA 220.

The DCR port 650 also enables the fixture adapter 520 to provide full-range (e.g., 0-10 VDC) dimming control for adding smooth digital dimming to a wide range of legacy fixture types. As described above, the DLA 220 generates digital control signals for changing the light level, color temperature, chromaticity, etc. of the illumination emitted by the fixture 110 based on data from the fixture adapter 520. In this case, the fixture adapter 520 receives these digital control signals and converts them to 0-10 V analog dimming signals using signal conditioning circuitry 640. This signal conditioning circuitry 640 transmits the analog dimming signals to the fixture via a dimming output 642, which may include a 0-10 VDC output connector and a 0-10 VDC reference connector. The fixture adapter 520 may supply this analog dimming signal continuously until it receives another digital control signal from the DLA 220. As mentioned above, one of the problems with 0-10 VDC dimming control is that it is not guaranteed to be consistent from fixture to fixture—for example, two otherwise identical fixtures may output different light levels when both are dimmed to 3.5 V on the 0-10 VDC input. Because of this, the fixture adapter 520 may also store and execute a programmable calibration function to allow customization of the relationship between commanded output level (e.g. "set to 35% of maximum brightness" coming from the DLA 220) and the 0-10 VDC output signal.

Like the DCR lighting fixture 210, the fixture adapter 520 may transmit identifying information, such as type and serial number, and capability information, such as a maximum light output and color temperature, to the DLA 220. It may do this in response to a query from the DLA 220, as part of a periodic "health-check" transmission, upon power up, etc. The fixture adapter 520 may derive and/or store information about the conventional fixture 110, such as fixture type, location, capability, etc., and provide this information to DLA 220, either automatically or in response to a command.

In addition, the DLA 220 may also reprogram the fixture adapter 520 via the bidirectional data link 236. For instance, the DLA 220 may update firmware used by the fixture adapter 520. It may also load calibration data or look-up table data used by the DCR lighting fixture 220 to convert the digital command signals from the DLA 220 into analog dimming signal voltage levels for controlling the fixture 110. In addition, the DLA 220 may set one or more of the fixture adapter's "persistent" operating parameters, such as maximum power or illumination levels.

The fixture adapter 520 may include a housing 670 that defines a compact, bolt-on enclosure, e.g., one with a rugged, small form factor IP30-rated ABS enclosure suitable for mounting in a variety of environments. For instance, the housing 670 may be about 2.5 cm high by 3.0 cm wide by 17.8 cm deep. It may be injection-molded or otherwise formed from a polymeric material, such as ABS polymer, that is tough, resistant to impact and heat, and conforms with the appropriate fire and electrical safety standards. The housing 670 may protect the fixture adapter's electronic components well enough to sustain operation over a temperature range of about −40° C. to about 50° C. and a humidity range of about 0% to about 95%.

Energy Savings

Figure 7A:
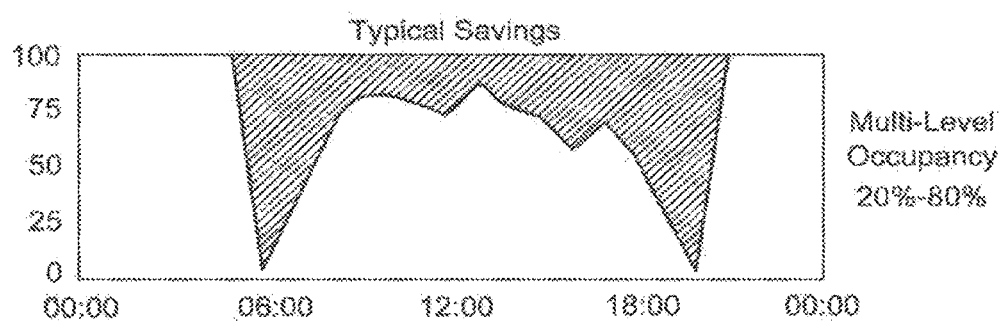
FIGS. 7A-7D show exemplary power savings achieved by implementing multi-level occupancy, task tuning, daylight harvesting, and scheduling responses with a DCR intelligent lighting system according to embodiments of the present invention.
Figure 7B:
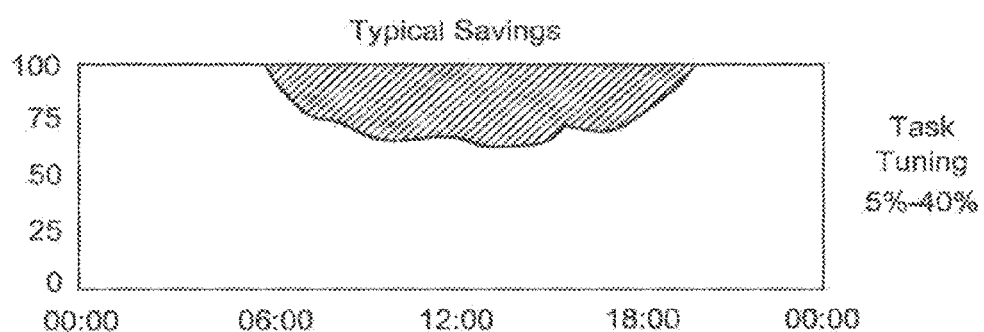
Figure 7C:
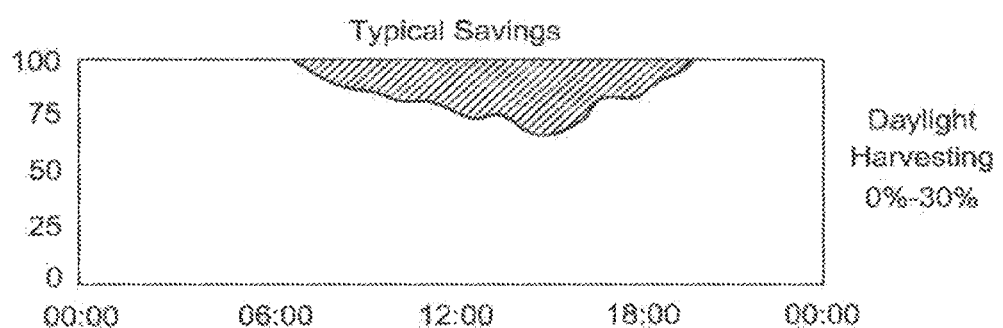
Figure 7D:
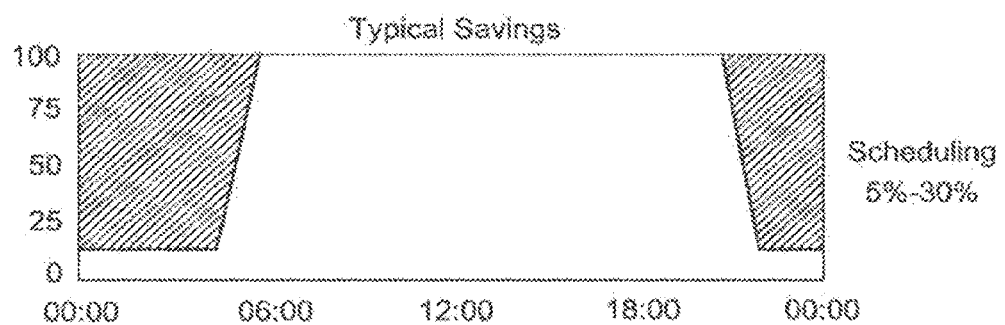
Figure 8:
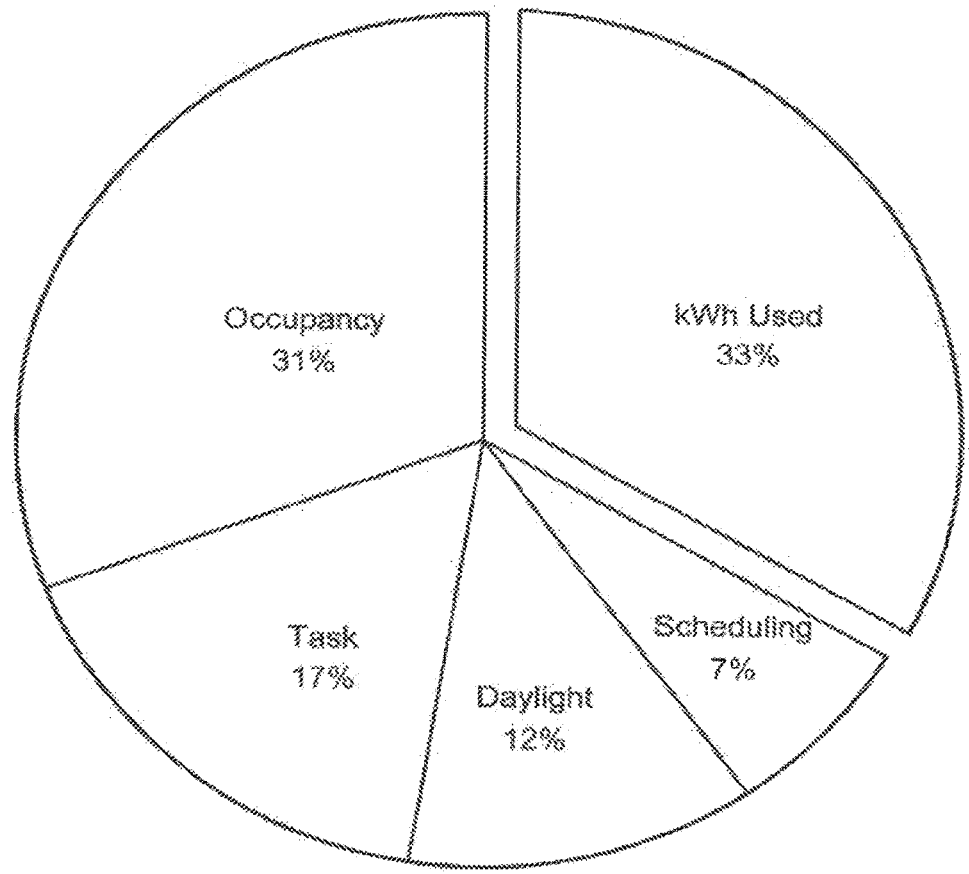
FIG. 8 is a pie chart that shows exemplary power savings distributed according to savings source with a DCR intelligent lighting system according to embodiments of the present invention.

FIGS. 7A-7D and 8 illustrate energy savings achievable with a DCR intelligent lighting system such as the ones shown in FIGS. 2A, 2B, 5A, and 5B. The plots in FIGS. 7A-7D show power consumption versus time of day for different types of behavior management supported by a DCR intelligent lighting system and the (constant) power consumption of a fixture that is always on (or turned on at the start of the work day (e.g., 6 am) and turned off at the end of the work day (e.g., 6 pm)). The highlighted areas represent the reduction in energy consumption realized with the corresponding behavior control as compared to the energy consumption of a comparable lighting system that is always on. FIG. 7A shows that multi-level occupancy-based control results in a 20-80% energy savings; FIG. 7B shows that task tuning results in a 5-40% energy savings; FIG. 7C shows that daylight harvesting results in up 30% energy savings; and FIG. 7D shows that scheduling results in a 5-30% energy savings. FIG. 8 shows energy savings apportioned to each type of behavior management. These plots show that using many different types of sensors (occupancy, ambient light, time-of-day) and control strategies (e.g., multi-level occupancy-based control, task-tuning, daylight harvesting, and scheduling) leads to greater energy savings. One innovation associated with the DCR lighting networks and DCR-enabled lighting fixtures, fixture adapters, and DLAs disclosed herein is the integration of these different types of sensors into a low-cost, modular hardware package (e.g., DLA 220 in FIG. 2) and using software to implement the control strategies (versus the hard-wired behavior of the multi-box architecture shown in FIG. 1).

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The DLAs, DLAFAs, DCR lighting fixtures, and other electronic devices disclosed herein may each include a memory (e.g., EEPROM 430 in FIG. 4), one or more processing units (also referred to herein simply as "processors"; e.g., microcontrollers 310, 410, and 610), one or more communication interfaces (e.g., DCR ports 350, 450, and 650), one or more display units (e.g., LEDs, liquid-crystal displays, etc.), and one or more data input devices (e.g., keypads, antennas, etc.). The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the electronic device to transmit communications to and/or receive communications from other devices. The display unit(s) may be provided, for example, to allow a user to view various information in connection with execution of the instructions. The user input device(s) may be provided, for example, to allow the user to make manual adjustments, make selections, enter data or various other information, and/or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus for controlling at least one dimmable lighting fixture by varying a variable output power provided to the at least one dimmable lighting fixture, the apparatus comprising:
  at least one sensor to generate at least one sensor signal representative of a change in an environment illuminated by the at least one dimmable lighting fixture;
  an alternating current (AC) power input to receive AC electrical power;
  a switchable power supply, operably coupled to the AC power input, to generate the variable output power;
  a power measurement circuit, operably coupled to the AC power input, to monitor electrical power consumption of the at least one dimmable lighting fixture;
  a processor, operably coupled to the at least one sensor and the switchable power supply, to generate at least one digital control signal based on the electrical power consumption and the at least one sensor signal and to control the variable output power generated by the switchable power supply; and
  at least one interface, operably coupled to the processor, to send and receive information related to the operation of the at least one dimmable lighting fixture and to provide the variable output power to the at least one dimmable lighting fixture.

2. The apparatus of claim 1, further comprising:
a memory, operably coupled to the processor, to store at least one parameter based at least in part on at least one of the electrical power consumption or the at least one sensor signal.

3. The apparatus of claim 1, wherein the apparatus is operably coupleable to a gateway, server, or other central management device.

4. The apparatus of claim 1, wherein the apparatus provides the variable output power to the at least one dimmable lighting fixture and to at least one other dimmable lighting fixture serially coupled to the at least one dimmable lighting fixture.

5. The apparatus of claim 1, further comprising:
a power conversion circuit, operably coupled to the AC power input, to convert the AC electrical power into direct current (DC) electrical power.

6. A system comprising:
the apparatus of claim 1, and
the at least one dimmable lighting fixture operably coupled to the at least one interface.

7. The system of claim 6, wherein the information related to the operation includes information about at least one of power consumption health of the at least one dimmable lighting fixture or at least one fault in the apparatus.

8. The system of claim 6, wherein the information related to the operation of the at least one dimmable lighting fixture includes at least one of identifying information or capability information.

9. The system of claim 6, wherein the system is configured to provide at least one of occupancy control, task tuning, or daylight harvesting for reduced power consumption of the at least one dimmable lighting fixture.

10. A method of controlling at least one dimmable lighting fixture by varying a variable output power provided to the at least one dimmable lighting fixture, the method comprising:
receiving, via an alternating current (AC) power input, AC electrical power;
generating, via at least one sensor, at least one sensor signal representative of a change in an environment illuminated by the at least one dimmable lighting fixture;
monitoring, via a power measurement circuit, electrical power consumption of the at least one dimmable lighting fixture;
generating, via a processor, at least one digital control signal based on the electrical power consumption and the at least one sensor signal;
generating, via a switchable power supply, the variable output power to power the at least one dimmable lighting fixture;
controlling via the processor, the variable output power generated by the switchable power supply;
transmitting, via at least one interface, information related to the operation of the at least one dimmable lighting fixture to the at least one dimmable lighting fixture; and
providing, via the at least one interface, the variable output power to the at least one dimmable lighting fixture.

11. The method of claim 10, further comprising:
storing, in a memory, at least one parameter based at least in part on at least one of the electrical power consumption or the at least one sensor signal.

12. The method of claim 10, further comprising:
providing, via the at least one interface, the variable output power to the at least one dimmable lighting fixture and to at least one other dimmable lighting fixture serially coupled to the at least one dimmable lighting fixture.

13. The method of claim 10, further comprising:
communicating, via the at least one interface, information related to the operation of the at least one dimmable lighting fixture, the information including information about at least one of power consumption health of the at least one dimmable lighting fixture or at least one fault in the apparatus.

14. The method of claim 10, wherein the generating, via the at least one sensor, at least one sensor signal representative of a change in an environment comprises sensing a change in at least one of an occupancy of the environment, a temperature of the environment, or an ambient light level of the environment.

15. The method of claim 10, further comprising:
determining a change in variable illumination from at least one dimmable lighting fixture based at least in part on the at least one sensor signal representative of a change in the environment.

16. The method of claim 15, further comprising
determining the change in variable illumination of the at least one dimmable lighting fixture based at least in part on the power consumption of the at least one dimmable lighting fixture.

* * * * *

UNITED STATES PATENT AND TRADEMARK OFFICE
CERTIFICATE OF CORRECTION

PATENT NO. : 9,832,832 B2  
APPLICATION NO. : 14/960105  
DATED : November 28, 2017  
INVENTOR(S) : Brian J. Chemel et al.

Page 1 of 1

It is certified that error appears in the above-identified patent and that said Letters Patent is hereby corrected as shown below:

On the Title Page

Page 2, (60) Related U.S. Application Data:
"Provisional application No. 61/762,592, filed on Feb. 8, 2013, provisional application No. 61/867,635, filed on Sep. 6, 2012, provisional application No. 61/612,580, filed on Mar. 19, 2012."
Should read:
-- Provisional application No. 61/762,592, filed on Feb. 8, 2013, provisional application No. 61/697,635, filed on Sep. 6, 2012, provisional application No. 61/612,580, filed on Mar. 19, 2012. --

Signed and Sealed this  
Eighth Day of May, 2018

Andrei Iancu  
*Director of the United States Patent and Trademark Office*